(12) United States Patent
Khairallah et al.

(10) Patent No.: US 12,162,074 B2
(45) Date of Patent: Dec. 10, 2024

(54) SYSTEM AND METHOD FOR LARGE-AREA PULSED LASER MELTING OF METALLIC POWDER IN A LASER POWDER BED FUSION APPLICATION

(71) Applicants: Lawrence Livermore National Security, LLC, Livermore, CA (US); Seurat Technologies, Inc., Wilmington, MA (US)

(72) Inventors: Saad A. Khairallah, Livermore, CA (US); John Roehling, Livermore, CA (US); Yiyu Shen, Tewksbury, MA (US); Andrew James Bayramian, Marblehead, MA (US); Ning Duanmu, Nashua, NH (US); James A. Demuth, Woburn, MA (US)

(73) Assignees: Lawrence Livermore National Security, LLC, Livermore, CA (US); Seurat Technologies, Inc., Wilmington, MA (US)

( * ) Notice: Subject to any disclaimer, the term of this patent is extended or adjusted under 35 U.S.C. 154(b) by 547 days.

(21) Appl. No.: 17/492,832

(22) Filed: Oct. 4, 2021

(65) Prior Publication Data
US 2022/0161332 A1     May 26, 2022

Related U.S. Application Data

(60) Provisional application No. 63/118,376, filed on Nov. 25, 2020.

(51) Int. Cl.
*B22F 12/43*     (2021.01)
*B22F 10/28*     (2021.01)
(Continued)

(52) U.S. Cl.
CPC ............. *B22F 12/43* (2021.01); *B22F 10/28* (2021.01); *B23K 26/0608* (2013.01);
(Continued)

(58) Field of Classification Search
None
See application file for complete search history.

(56) References Cited

U.S. PATENT DOCUMENTS 3,080,760 A     3/1963    Piersma
3,704,997 A     12/1972   Smith
(Continued)

FOREIGN PATENT DOCUMENTS

CN     1593817 A      3/2005
CN     103341625 A    10/2013
(Continued)

OTHER PUBLICATIONS

Machine translation of DE-19953000-A1 (Year: 2024).*
(Continued)

*Primary Examiner* — Geoffrey S Evans
(74) *Attorney, Agent, or Firm* — HARNESS, DICKEY & PIERCE, P.L.C.

(57) ABSTRACT

The present disclosure relates to systems and methods for performing large area laser powder bed fusion (LBPF) to form a plurality of layers of a 3D part in a layer-by-layer fashion using meltable powder particles. In one implementation the system makes use of a first light source, which may be a diode laser subsystem, for generating a first light pulse of a first duration. The first light is used to preheat a substrate underneath a new layer of powder particles, wherein the substrate is formed from a previously fused quantity of the powder particles. A second light source, which may be a pulse laser, generates a second light pulse subsequent to the first light pulse. The second light pulse has (Continued)

a second duration shorter than the first duration by a factor of at least about 10, and fully melts the new layer of powder particles in addition to the substrate, to achieve a smooth printed layer. The wavelength of the first light pulse also differs from a wavelength of the second light pulse.

17 Claims, 23 Drawing Sheets

(51) Int. Cl.
*B23K 26/06* (2014.01)
*B23K 26/0622* (2014.01)
*B23K 26/342* (2014.01)
*B33Y 10/00* (2015.01)
*B33Y 30/00* (2015.01)

(52) U.S. Cl.
CPC ........ *B23K 26/0622* (2015.10); *B23K 26/342* (2015.10); *B33Y 10/00* (2014.12); *B33Y 30/00* (2014.12)

(56) References Cited

U.S. PATENT DOCUMENTS

| | | |
|---|---|---|
| 3,796,162 A | 3/1974 | Burdick et al. |
| 4,247,508 A | 1/1981 | Housholder |
| 4,286,466 A | 9/1981 | Stewart |
| 4,338,022 A | 7/1982 | Farago |
| 4,655,548 A | 4/1987 | Jue |
| 4,659,902 A | 4/1987 | Swensrud et al. |
| 4,712,120 A | 12/1987 | Latto |
| 4,718,288 A | 1/1988 | Leschonski et al. |
| 4,771,641 A | 9/1988 | Beltrop et al. |
| 4,782,945 A | 11/1988 | Geiler et al. |
| 4,944,817 A | 7/1990 | Bourell et al. |
| 5,155,324 A | 10/1992 | Deckard et al. |
| 5,236,637 A | 8/1993 | Hull |
| 5,258,989 A | 11/1993 | Raven |
| 5,269,982 A | 12/1993 | Brotz |
| 5,314,003 A | 5/1994 | Mackay |
| 5,337,620 A | 8/1994 | Kalidini |
| 5,352,405 A | 10/1994 | Beaman et al. |
| 5,382,308 A | 1/1995 | Bourell et al. |
| 5,503,785 A | 4/1996 | Crump et al. |
| 5,508,489 A | 4/1996 | Benda et al. |
| 5,536,467 A | 7/1996 | Reichle et al. |
| 5,583,304 A | 12/1996 | Kalidindi |
| 5,601,733 A | 2/1997 | Partlo |
| 5,622,577 A | 4/1997 | O'Connor |
| 5,640,667 A | 6/1997 | Freitag et al. |
| 5,674,414 A | 10/1997 | Schweizer |
| 5,682,214 A | 10/1997 | Amako et al. |
| 5,738,088 A | 4/1998 | Townsend |
| 5,765,934 A | 6/1998 | Okamori et al. |
| 5,771,260 A | 6/1998 | Elliott et al. |
| 5,837,960 A | 11/1998 | Lewis et al. |
| 5,840,239 A | 11/1998 | Partanen et al. |
| 5,908,569 A | 6/1999 | Wilkening et al. |
| 5,991,015 A | 11/1999 | Zamel et al. |
| 6,005,717 A | 12/1999 | Neuberger et al. |
| 6,031,201 A | 2/2000 | Amako et al. |
| 6,043,475 A | 3/2000 | Shimada et al. |
| 6,053,615 A | 4/2000 | Peterson et al. |
| 6,064,528 A | 5/2000 | Simpson, Jr. |
| 6,066,285 A | 5/2000 | Kumar |
| 6,183,092 B1 | 2/2001 | Troyer |
| 6,184,490 B1 | 2/2001 | Schweizer |
| 6,253,629 B1 | 7/2001 | Lee et al. |
| 6,339,966 B1 | 1/2002 | Kalidindi |
| 6,375,874 B1 | 4/2002 | Russell et al. |
| 6,405,095 B1 | 6/2002 | Jang et al. |
| 6,424,670 B1 | 7/2002 | Sukhman et al. |
| 6,462,306 B1 | 10/2002 | Kitai et al. |
| 6,560,001 B1 | 5/2003 | Igasaki et al. |
| 6,583,379 B1 | 6/2003 | Meiners et al. |
| 6,641,778 B2 | 11/2003 | McGregor |
| 6,666,556 B2 | 12/2003 | Hansen et al. |
| 6,676,892 B2 | 1/2004 | Das et al. |
| 6,682,684 B1 | 1/2004 | Jamalabad et al. |
| 6,717,106 B2 | 4/2004 | Nagano et al. |
| 6,721,096 B2 | 4/2004 | Bruzzone et al. |
| 6,758,324 B2 | 7/2004 | Joutsjoki et al. |
| 6,781,763 B1 | 8/2004 | Tamburino et al. |
| 6,851,459 B2 | 2/2005 | Squirrell et al. |
| 6,920,973 B2 | 7/2005 | Koren et al. |
| 6,957,736 B2 | 10/2005 | Bonifer et al. |
| 7,077,638 B2 | 7/2006 | Leyden et al. |
| 7,088,432 B2 | 8/2006 | Zhang |
| 7,113,324 B2 | 9/2006 | Lee et al. |
| 7,205,230 B2 | 4/2007 | Mashino |
| 7,234,820 B2 | 6/2007 | Harbers et al. |
| 7,351,051 B2 | 4/2008 | Hagiwara |
| 7,357,629 B2 | 4/2008 | Weiskopf et al. |
| 7,444,046 B2 | 10/2008 | Karlsen |
| 7,509,738 B2 | 3/2009 | Adams et al. |
| 7,569,174 B2 | 8/2009 | Ruatta et al. |
| 7,635,825 B2 | 12/2009 | Larsson |
| 7,686,995 B2 | 3/2010 | Davidson et al. |
| 7,700,016 B2 | 4/2010 | Wigand et al. |
| 7,713,048 B2 | 5/2010 | Perret et al. |
| 7,777,155 B2 | 8/2010 | Twelves, Jr. et al. |
| 7,790,096 B2 | 9/2010 | Merot et al. |
| 7,820,241 B2 | 10/2010 | Perret et al. |
| 7,887,316 B2 | 2/2011 | Cox |
| 7,895,879 B2 | 3/2011 | Robert |
| 7,971,991 B2 | 7/2011 | Davidson et al. |
| 7,979,152 B2 | 7/2011 | Davidson |
| 8,046,097 B2 | 10/2011 | Hull et al. |
| 8,073,315 B2 | 12/2011 | Philippi |
| 8,155,775 B2 | 4/2012 | Batchelder |
| 8,199,787 B2 | 6/2012 | Deri et al. |
| 8,209,044 B2 | 6/2012 | Inoue |
| 8,226,395 B2 | 7/2012 | Pax et al. |
| 8,287,794 B2 | 10/2012 | Pax et al. |
| 8,425,043 B2 | 4/2013 | Miyazawa |
| 8,462,828 B1 | 6/2013 | Estes |
| 8,470,231 B1 | 6/2013 | Dikovsky et al. |
| 8,485,808 B2 | 7/2013 | Amaya et al. |
| 8,514,475 B2 | 8/2013 | Deri et al. |
| 8,525,070 B2 | 9/2013 | Tanaka et al. |
| 8,525,943 B2 | 9/2013 | Burgess |
| 8,553,311 B2 | 10/2013 | Kleinert |
| 8,562,897 B2 | 10/2013 | Abe et al. |
| 8,568,646 B2 | 10/2013 | Wang et al. |
| 8,575,528 B1 | 11/2013 | Barchers |
| 8,666,142 B2 | 3/2014 | Shkolnik et al. |
| 8,668,859 B2 | 3/2014 | Pettis |
| 8,700,205 B2 | 4/2014 | Scheuerman et al. |
| 8,784,720 B2 | 7/2014 | Oberhofer et al. |
| 8,801,418 B2 | 8/2014 | El-Siblani et al. |
| 8,815,143 B2 | 8/2014 | John et al. |
| 8,827,681 B2 | 9/2014 | Chen et al. |
| 8,845,319 B2 | 9/2014 | Oberhofer et al. |
| 8,902,497 B2 | 12/2014 | Erlandson et al. |
| 8,903,533 B2 | 12/2014 | Eggers et al. |
| 8,982,313 B2 | 3/2015 | Escuti et al. |
| 9,027,668 B2 | 5/2015 | Zediker et al. |
| 9,114,478 B2 | 8/2015 | Scott et al. |
| 9,130,349 B2 | 9/2015 | Volodin |
| 9,136,668 B2 | 9/2015 | Bayramian et al. |
| 9,172,208 B1 | 10/2015 | Dawson et al. |
| 9,183,325 B2 | 11/2015 | Wighton et al. |
| 9,186,847 B2 | 11/2015 | Fruth et al. |
| 9,192,056 B2 | 11/2015 | Rubenchik et al. |
| 9,283,593 B2 | 3/2016 | Bruck et al. |
| 9,289,946 B2 | 3/2016 | Perez et al. |
| 9,308,583 B2 | 4/2016 | El-Dasher et al. |
| 9,331,452 B2 | 5/2016 | Bayramian |
| 9,348,208 B2 | 5/2016 | Suga et al. |
| 9,360,816 B1 | 6/2016 | Mabuchi et al. |
| 9,364,897 B2 | 6/2016 | O'Neill |
| 9,399,530 B2 | 7/2016 | Granger et al. |

(56) References Cited

U.S. PATENT DOCUMENTS

| | | |
|---|---|---|
| 9,409,255 B1 | 8/2016 | Martinsen et al. |
| 9,511,547 B2 | 12/2016 | Swanson et al. |
| 9,522,426 B2 | 12/2016 | Das et al. |
| 9,533,350 B2 | 1/2017 | Zhuang et al. |
| 9,555,582 B2 | 1/2017 | Javidan et al. |
| 9,561,626 B2 | 2/2017 | Griszbacher et al. |
| 9,573,193 B2 | 2/2017 | Buller et al. |
| 9,586,365 B2 | 3/2017 | Chen et al. |
| 9,636,868 B2 | 5/2017 | Crump et al. |
| 9,682,397 B2 | 6/2017 | Jakimov et al. |
| 9,688,020 B2 | 6/2017 | Teken et al. |
| 9,815,139 B2 | 11/2017 | Bruck et al. |
| 9,855,625 B2 | 1/2018 | El-Dasher et al. |
| 9,884,449 B2 | 2/2018 | Robles Flores et al. |
| 9,889,450 B2 | 2/2018 | She et al. |
| 9,910,346 B2 | 3/2018 | Huang et al. |
| 9,914,169 B2 | 3/2018 | Ederer et al. |
| 9,931,789 B2 | 4/2018 | Wiesner et al. |
| 9,957,116 B2 | 5/2018 | Staunton et al. |
| 9,962,767 B2 | 5/2018 | Buller et al. |
| 9,999,924 B2 | 6/2018 | Dave et al. |
| 10,011,079 B2 | 7/2018 | Wighton et al. |
| 10,029,333 B2 | 7/2018 | Green |
| 10,035,306 B2 | 7/2018 | Crump et al. |
| 10,052,820 B2 | 8/2018 | Kemmer et al. |
| 10,059,058 B2 | 8/2018 | Hartmann et al. |
| 10,099,430 B2 | 10/2018 | Dikovsky et al. |
| 10,112,380 B2 | 10/2018 | Evans et al. |
| 10,155,345 B2 | 12/2018 | Ermoshkin et al. |
| 10,155,882 B2 | 12/2018 | Rolland et al. |
| 10,166,751 B2 | 1/2019 | Kramer et al. |
| 10,195,692 B2 | 2/2019 | Rockstroh et al. |
| 10,195,693 B2 | 2/2019 | Buller et al. |
| 10,220,568 B2 | 3/2019 | Ederer et al. |
| 10,226,919 B2 | 3/2019 | Ederer |
| 10,245,784 B2 | 4/2019 | Teken et al. |
| 10,279,598 B2 | 5/2019 | Deppe |
| 10,294,658 B2 | 5/2019 | Scannon et al. |
| 10,328,685 B2 | 6/2019 | Jones et al. |
| 10,335,901 B2 | 7/2019 | Ferrar et al. |
| 10,399,145 B2 | 9/2019 | McMurtry et al. |
| 10,399,281 B2 | 9/2019 | Mannella et al. |
| 10,413,968 B2 | 9/2019 | Pialot et al. |
| 10,518,328 B2 | 12/2019 | DeMuth et al. |
| 2001/0008230 A1 | 7/2001 | Keicher et al. |
| 2001/0045678 A1 | 11/2001 | Kubo et al. |
| 2002/0015654 A1 | 2/2002 | Das et al. |
| 2002/0021723 A1 | 2/2002 | Amako et al. |
| 2002/0090313 A1 | 7/2002 | Wang et al. |
| 2002/0090410 A1 | 7/2002 | Tochimoto et al. |
| 2002/0124664 A1 | 9/2002 | Call et al. |
| 2002/0126727 A1 | 9/2002 | Sukhman et al. |
| 2002/0130279 A1 | 9/2002 | Jain et al. |
| 2002/0149137 A1 | 10/2002 | Jang et al. |
| 2002/0149852 A1 | 10/2002 | Dubinovsky et al. |
| 2002/0191235 A1 | 12/2002 | O'Connor et al. |
| 2003/0052105 A1 | 3/2003 | Nagano et al. |
| 2003/0075587 A1 | 4/2003 | Smashey et al. |
| 2003/0079819 A1 | 5/2003 | Abare et al. |
| 2003/0146066 A1 | 8/2003 | Ashton |
| 2003/0178750 A1 | 9/2003 | Kulkarni et al. |
| 2003/0222066 A1 | 12/2003 | Low et al. |
| 2004/0060639 A1 | 4/2004 | White |
| 2004/0063198 A1 | 4/2004 | Tilles et al. |
| 2004/0084814 A1 | 5/2004 | Boyd et al. |
| 2004/0172164 A1 | 9/2004 | Habibi et al. |
| 2004/0200812 A1 | 10/2004 | Grewell et al. |
| 2004/0222549 A1 | 11/2004 | Sano et al. |
| 2004/0240059 A1 | 12/2004 | Li |
| 2005/0012246 A1 | 1/2005 | Yoshino |
| 2005/0035085 A1 | 2/2005 | Stowell et al. |
| 2005/0083498 A1 | 4/2005 | Jeng |
| 2005/0131570 A1 | 6/2005 | Jamalabad et al. |
| 2005/0135751 A1 | 6/2005 | Zbinden |
| 2005/0242473 A1 | 11/2005 | Newell et al. |
| 2005/0263932 A1 | 12/2005 | Heugel |
| 2005/0280185 A1 | 12/2005 | Russell et al. |
| 2006/0034557 A1 | 2/2006 | Li et al. |
| 2006/0091120 A1 | 5/2006 | Markle |
| 2006/0111807 A1 | 5/2006 | Gothait et al. |
| 2006/0119949 A1 | 6/2006 | Tanaka et al. |
| 2006/0132732 A1 | 6/2006 | Kuit |
| 2006/0192322 A1 | 8/2006 | Abe et al. |
| 2006/0193059 A1 | 8/2006 | Gutierrez |
| 2006/0209409 A1 | 9/2006 | Li |
| 2006/0214335 A1 | 9/2006 | Cox |
| 2006/0219671 A1 | 10/2006 | Merot et al. |
| 2006/0232750 A1 | 10/2006 | Yokote |
| 2007/0008311 A1 | 1/2007 | Yoshino et al. |
| 2007/0024825 A1 | 2/2007 | Stephanes Maria De Vaan |
| 2007/0053074 A1 | 3/2007 | Krijn et al. |
| 2007/0057412 A1 | 3/2007 | Weiskopf et al. |
| 2007/0077323 A1 | 4/2007 | Stonesmith et al. |
| 2007/0122560 A1 | 5/2007 | Adams |
| 2007/0153644 A1 | 7/2007 | Corrain et al. |
| 2007/0179655 A1 | 8/2007 | Farnworth |
| 2007/0241482 A1 | 10/2007 | Giller et al. |
| 2007/0273797 A1 | 11/2007 | Silverstein et al. |
| 2008/0035619 A1 | 2/2008 | Hamaguchi et al. |
| 2008/0061531 A1 | 3/2008 | Nugent |
| 2008/0151341 A1 | 6/2008 | Perret et al. |
| 2008/0157412 A1 | 7/2008 | Kihara et al. |
| 2008/0158524 A1 | 7/2008 | Konno et al. |
| 2008/0190905 A1 | 8/2008 | Heinlein |
| 2008/0192205 A1 | 8/2008 | De Vaan |
| 2008/0201008 A1 | 8/2008 | Twelves et al. |
| 2008/0211132 A1 | 9/2008 | Feenstra |
| 2008/0223839 A1 | 9/2008 | Maruyama et al. |
| 2008/0231953 A1 | 9/2008 | Young |
| 2008/0241404 A1 | 10/2008 | Allaman et al. |
| 2008/0246705 A1 | 10/2008 | Russell et al. |
| 2008/0262659 A1 | 10/2008 | Huskamp |
| 2008/0285129 A1 | 11/2008 | Magarill et al. |
| 2009/0020901 A1 | 1/2009 | Schillen |
| 2009/0091839 A1 | 4/2009 | Kakui et al. |
| 2009/0101278 A1 | 4/2009 | Laberge-Lebel et al. |
| 2009/0169664 A1 | 7/2009 | Cox |
| 2009/0177309 A1 | 7/2009 | Kozlak |
| 2009/0206065 A1 | 8/2009 | Kruth et al. |
| 2009/0221422 A1 | 9/2009 | Miller |
| 2009/0245318 A1 | 10/2009 | Clifford, Jr. |
| 2010/0003619 A1 | 1/2010 | Das et al. |
| 2010/0006742 A1 | 1/2010 | Wurz et al. |
| 2010/0012630 A1 | 1/2010 | Leuterer |
| 2010/0045956 A1 | 2/2010 | Van De Kerkhof et al. |
| 2010/0089881 A1 | 4/2010 | Bruland et al. |
| 2010/0116796 A1 | 5/2010 | Jancso et al. |
| 2010/0140237 A1 | 6/2010 | Unrath |
| 2010/0176539 A1 | 7/2010 | Higashi et al. |
| 2010/0192806 A1 | 8/2010 | Heugel et al. |
| 2010/0202048 A1 | 8/2010 | Amitai et al. |
| 2010/0228369 A1 | 9/2010 | Eggers et al. |
| 2010/0233012 A1 | 9/2010 | Higashi et al. |
| 2010/0253769 A1 | 10/2010 | Coppeta et al. |
| 2010/0262272 A1 | 10/2010 | Shkolnik et al. |
| 2011/0000322 A1 | 1/2011 | Chen et al. |
| 2011/0019705 A1 | 1/2011 | Adams et al. |
| 2011/0033887 A1 | 2/2011 | Fang et al. |
| 2011/0049766 A1 | 3/2011 | Del Mundo et al. |
| 2011/0051092 A1 | 3/2011 | Mashitani |
| 2011/0122999 A1 | 5/2011 | Vogtmeier et al. |
| 2011/0190904 A1 | 8/2011 | Lechmann et al. |
| 2011/0221099 A1* | 9/2011 | Oberhofer ............ B29C 64/135 |
| | | 264/401 |
| 2011/0233808 A1 | 9/2011 | Davidson |
| 2011/0241947 A1 | 10/2011 | Scott et al. |
| 2011/0252618 A1 | 10/2011 | Diekmann et al. |
| 2011/0258837 A1 | 10/2011 | Scannon et al. |
| 2011/0259862 A1 | 10/2011 | Scott et al. |
| 2011/0278269 A1 | 11/2011 | Gold et al. |
| 2011/0291331 A1 | 12/2011 | Scott |
| 2012/0007888 A1 | 1/2012 | Maiorova |
| 2012/0010741 A1 | 1/2012 | Hull et al. |
| 2012/0039565 A1 | 2/2012 | Klein et al. |

(56) References Cited

U.S. PATENT DOCUMENTS

| | | |
|---|---|---|
| 2012/0046779 A1 | 2/2012 | Pax et al. |
| 2012/0113439 A1 | 5/2012 | Ederer |
| 2012/0119399 A1 | 5/2012 | Fruth |
| 2012/0139166 A1 | 6/2012 | Abe et al. |
| 2012/0139167 A1 | 6/2012 | Fruth et al. |
| 2012/0188515 A1 | 7/2012 | Huang |
| 2012/0195994 A1 | 8/2012 | El-Siblani et al. |
| 2012/0236425 A1 | 9/2012 | O'Neill |
| 2013/0026680 A1 | 1/2013 | Ederer et al. |
| 2013/0052291 A1 | 2/2013 | Morikawa |
| 2013/0056910 A1 | 3/2013 | Houbertz-Krauss et al. |
| 2013/0060535 A1 | 3/2013 | Fruth |
| 2013/0064706 A1 | 3/2013 | Schwarze et al. |
| 2013/0077315 A1 | 3/2013 | Moffatt |
| 2013/0078006 A1 | 3/2013 | Kawashima |
| 2013/0078073 A1 | 3/2013 | Comb et al. |
| 2013/0101746 A1 | 4/2013 | Keremes et al. |
| 2013/0102447 A1 | 4/2013 | Strong et al. |
| 2013/0108726 A1 | 5/2013 | Uckelmann et al. |
| 2013/0112672 A1 | 5/2013 | Keremes et al. |
| 2013/0134637 A1 | 5/2013 | Wiesner et al. |
| 2013/0136868 A1 | 5/2013 | Bruck et al. |
| 2013/0193620 A1 | 8/2013 | Mironets et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0271800 A1 | 10/2013 | Kanugo |
| 2013/0300286 A1 | 11/2013 | Ljungblad et al. |
| 2013/0302533 A1 | 11/2013 | Bruck |
| 2013/0309121 A1 | 11/2013 | Prest et al. |
| 2013/0312928 A1 | 11/2013 | Mercelis et al. |
| 2014/0048971 A1 | 2/2014 | Mannella et al. |
| 2014/0048981 A1 | 2/2014 | Crump et al. |
| 2014/0052285 A1 | 2/2014 | Butcher et al. |
| 2014/0065194 A1 | 3/2014 | Yoo et al. |
| 2014/0077421 A1 | 3/2014 | Minick |
| 2014/0085631 A1 | 3/2014 | Lacour et al. |
| 2014/0116998 A1 | 5/2014 | Chen |
| 2014/0140882 A1 | 5/2014 | Syassen |
| 2014/0154088 A1 | 6/2014 | Etter et al. |
| 2014/0158667 A1 | 6/2014 | Stecker et al. |
| 2014/0186205 A1 | 7/2014 | O'Neill |
| 2014/0198365 A1 | 7/2014 | Li et al. |
| 2014/0199175 A1 | 7/2014 | Godfrey et al. |
| 2014/0202381 A1 | 7/2014 | Ederer et al. |
| 2014/0203479 A1 | 7/2014 | Teken et al. |
| 2014/0236339 A1 | 8/2014 | Fagan |
| 2014/0252687 A1 | 9/2014 | El-Dasher et al. |
| 2014/0263209 A1 | 9/2014 | Burris et al. |
| 2014/0265034 A1 | 9/2014 | Dudley |
| 2014/0265049 A1 | 9/2014 | Burris et al. |
| 2014/0271326 A1 | 9/2014 | Cullen et al. |
| 2014/0271328 A1 | 9/2014 | Burris et al. |
| 2014/0271965 A1 | 9/2014 | Ferrar |
| 2014/0277679 A1 | 9/2014 | Weinberg et al. |
| 2014/0301883 A1 | 10/2014 | Wiesner et al. |
| 2014/0302187 A1 | 10/2014 | Pawlikowski et al. |
| 2014/0306379 A1 | 10/2014 | Hartmann et al. |
| 2014/0314609 A1 | 10/2014 | Ljungblad et al. |
| 2014/0367367 A1 | 12/2014 | Wood et al. |
| 2014/0367894 A1 | 12/2014 | Kramer et al. |
| 2015/0030494 A1 | 1/2015 | Ward-Close |
| 2015/0034123 A1 | 2/2015 | Pressacco et al. |
| 2015/0054191 A1 | 2/2015 | Ljungblad |
| 2015/0061170 A1 | 3/2015 | Engel et al. |
| 2015/0066178 A1 | 3/2015 | Stava |
| 2015/0069659 A1 | 3/2015 | Hartmann |
| 2015/0076732 A1 | 3/2015 | Kemmer et al. |
| 2015/0081080 A1 | 3/2015 | Tseng |
| 2015/0090074 A1 | 4/2015 | Etter et al. |
| 2015/0096266 A1 | 4/2015 | Divine et al. |
| 2015/0097307 A1 | 4/2015 | Batchelder et al. |
| 2015/0097315 A1 | 4/2015 | DeSimone et al. |
| 2015/0102526 A1 | 4/2015 | Ward et al. |
| 2015/0125334 A1 | 5/2015 | Uetani et al. |
| 2015/0125335 A1 | 5/2015 | Bruck et al. |
| 2015/0132173 A1 | 5/2015 | Bruck et al. |
| 2015/0137426 A1 | 5/2015 | Van Esbroeck et al. |
| 2015/0153544 A1 | 6/2015 | Pedersen |
| 2015/0158111 A1 | 6/2015 | Schwarze et al. |
| 2015/0165556 A1 | 6/2015 | Jones et al. |
| 2015/0165681 A1 | 6/2015 | Fish et al. |
| 2015/0165687 A1 | 6/2015 | Ho et al. |
| 2015/0183166 A1 | 7/2015 | Yoo et al. |
| 2015/0210013 A1 | 7/2015 | Teulet |
| 2015/0211083 A1 | 7/2015 | Gabilondo et al. |
| 2015/0217403 A1 | 8/2015 | Nakazawa et al. |
| 2015/0251249 A1 | 9/2015 | Fager |
| 2015/0273631 A1 | 10/2015 | Kenney et al. |
| 2015/0273632 A1 | 10/2015 | Chen |
| 2015/0283612 A1 | 10/2015 | Maeda et al. |
| 2015/0283613 A1 | 10/2015 | Backlund et al. |
| 2015/0283614 A1 | 10/2015 | Wu et al. |
| 2015/0311064 A1 | 10/2015 | Stuart et al. |
| 2015/0336330 A1 | 11/2015 | Herzog |
| 2015/0343664 A1 | 12/2015 | Liu |
| 2015/0352668 A1 | 12/2015 | Scott et al. |
| 2015/0360418 A1 | 12/2015 | Shah et al. |
| 2015/0375456 A1 | 12/2015 | Cheverton et al. |
| 2016/0001364 A1 | 1/2016 | Mironets et al. |
| 2016/0010884 A1 | 1/2016 | Holtz et al. |
| 2016/0045981 A1 | 2/2016 | Zurecki et al. |
| 2016/0067779 A1 | 3/2016 | Dautova et al. |
| 2016/0067923 A1 | 3/2016 | James et al. |
| 2016/0082662 A1 | 3/2016 | Majer |
| 2016/0096326 A1 | 4/2016 | Naware |
| 2016/0114432 A1 | 4/2016 | Ferrar et al. |
| 2016/0121271 A1 | 5/2016 | Lescoche et al. |
| 2016/0144428 A1 | 5/2016 | Mironets et al. |
| 2016/0175935 A1 | 6/2016 | Ladewig et al. |
| 2016/0184893 A1 | 6/2016 | Dave et al. |
| 2016/0193695 A1 | 7/2016 | Haynes |
| 2016/0193696 A1 | 7/2016 | Mcfarland et al. |
| 2016/0207259 A1 | 7/2016 | Fruth |
| 2016/0228987 A1 | 8/2016 | Baudimont et al. |
| 2016/0236279 A1 | 8/2016 | Ashton et al. |
| 2016/0236422 A1 | 8/2016 | Sakura |
| 2016/0243652 A1 | 8/2016 | El-Dasher et al. |
| 2016/0263822 A1 | 9/2016 | Boyd, IV |
| 2016/0279707 A1 | 9/2016 | Mattes et al. |
| 2016/0288416 A1 | 10/2016 | Robles Flores et al. |
| 2016/0318253 A1 | 11/2016 | Barnhart |
| 2016/0322777 A1 | 11/2016 | Zediker et al. |
| 2017/0017054 A1 | 1/2017 | Roffers et al. |
| 2017/0021455 A1 | 1/2017 | Dallarosa et al. |
| 2017/0036783 A1 | 2/2017 | Snyder |
| 2017/0120332 A1 | 5/2017 | DeMuth et al. |
| 2017/0120529 A1 | 5/2017 | DeMuth et al. |
| 2017/0157850 A1 | 6/2017 | Duan et al. |
| 2017/0165911 A1 | 6/2017 | Kiriyama et al. |
| 2017/0190113 A1 | 7/2017 | Calefati et al. |
| 2017/0209923 A1 | 7/2017 | Giovannetti et al. |
| 2017/0210621 A1 | 7/2017 | Schiebel et al. |
| 2017/0232557 A1 | 8/2017 | DeMuth et al. |
| 2017/0232637 A1 | 8/2017 | DeMuth et al. |
| 2017/0304897 A1 | 10/2017 | Walrand et al. |
| 2017/0330370 A1 | 11/2017 | Kim et al. |
| 2017/0371168 A1 | 12/2017 | Dewald et al. |
| 2018/0021978 A1 | 1/2018 | Todorov et al. |
| 2018/0029127 A1 | 2/2018 | Ng et al. |
| 2018/0065178 A1 | 3/2018 | Rowland et al. |
| 2018/0065209 A1 | 3/2018 | Foret |
| 2018/0079003 A1 | 3/2018 | Lin et al. |
| 2018/0079033 A1 | 3/2018 | Krueger et al. |
| 2018/0086004 A1 | 3/2018 | Van Espen |
| 2018/0141160 A1 | 5/2018 | Karp et al. |
| 2018/0154484 A1 | 6/2018 | Hall |
| 2018/0207722 A1 | 7/2018 | Feldmann et al. |
| 2018/0210064 A1 | 7/2018 | Send et al. |
| 2018/0215093 A1 | 8/2018 | Chimmalgi |
| 2018/0239335 A1 | 8/2018 | Barr et al. |
| 2018/0257301 A1 | 9/2018 | Ng et al. |
| 2018/0281065 A1 | 10/2018 | Perry et al. |
| 2018/0281282 A1 | 10/2018 | Elgar et al. |

(56) References Cited

U.S. PATENT DOCUMENTS

| | | | |
|---|---|---|---|
| 2018/0326654 A1 | 11/2018 | Ederer et al. | |
| 2018/0326664 A1 | 11/2018 | DeMuth et al. | |
| 2018/0326665 A1 | 11/2018 | Gatenholm et al. | |
| 2019/0022752 A1* | 1/2019 | Twelves, Jr. | B22F 5/04 |
| 2019/0036337 A1 | 1/2019 | Zhang et al. | |
| 2019/0084041 A1 | 3/2019 | Ott et al. | |
| 2020/0139694 A1 | 5/2020 | Armijo et al. | |

FOREIGN PATENT DOCUMENTS

| | | | |
|---|---|---|---|
| CN | 203635917 U | 6/2014 | |
| CN | 103990798 A | 8/2014 | |
| CN | 104669619 A | 6/2015 | |
| CN | 103990798 B | 10/2015 | |
| CN | 206217173 U | 6/2017 | |
| DE | 3029104 A1 | 2/1982 | |
| DE | 4436695 C1 | 12/1995 | |
| DE | 19528215 A1 | 2/1997 | |
| DE | 19511772 C2 | 9/1997 | |
| DE | 19821770 C1 | 4/1999 | |
| DE | 19905067 A1 | 8/2000 | |
| DE | 19937260 A1 | 2/2001 | |
| DE | 19939616 A1 | 3/2001 | |
| DE | 19953000 A1 * | 5/2001 | B22F 3/1055 |
| DE | 10112591 A1 | 10/2001 | |
| DE | 10042132 A1 | 3/2002 | |
| DE | 10104732 C1 | 6/2002 | |
| DE | 10108612 C1 | 6/2002 | |
| DE | 10236907 A1 | 2/2004 | |
| DE | 102004041633 A1 | 3/2006 | |
| DE | 102005014483 A1 | 10/2006 | |
| DE | 102006014281 A1 | 10/2006 | |
| DE | 102005024790 A1 | 12/2006 | |
| DE | 102007006478 A1 | 8/2008 | |
| DE | 102007014683 A1 | 10/2008 | |
| DE | 102007014968 A1 | 10/2008 | |
| DE | 102007029052 A1 | 1/2009 | |
| DE | 102010034311 A1 | 2/2012 | |
| DE | 102010046579 A1 | 3/2012 | |
| DE | 102013000511 A1 | 7/2014 | |
| DE | 102013205029 A1 | 9/2014 | |
| DE | 102013222339 A1 | 5/2015 | |
| EP | 395156 A1 | 10/1990 | |
| EP | 0402944 A2 | 12/1990 | |
| EP | 0451681 A2 | 10/1991 | |
| EP | 0676890 A2 | 10/1995 | |
| EP | 683425 A1 | 11/1995 | |
| EP | 0338751 B1 | 3/1996 | |
| EP | 1115255 A1 | 7/2001 | |
| EP | 1400339 A1 | 3/2004 | |
| EP | 1700686 A2 | 9/2006 | |
| EP | 1839781 A2 | 10/2007 | |
| EP | 1872928 A1 | 1/2008 | |
| EP | 2221132 A1 | 8/2010 | |
| EP | 2335848 A1 | 6/2011 | |
| EP | 2492084 A1 | 8/2012 | |
| EP | 2666613 A1 | 11/2013 | |
| EP | 2674283 A2 | 12/2013 | |
| EP | 2832528 A1 | 2/2015 | |
| EP | 2862651 A1 | 4/2015 | |
| EP | 2875897 A1 | 5/2015 | |
| EP | 2910362 A1 | 8/2015 | |
| EP | 2926979 A1 | 10/2015 | |
| EP | 2964418 A1 | 1/2016 | |
| EP | 3184208 A1 | 6/2017 | |
| EP | 2992942 B1 | 6/2019 | |
| FR | 2567668 A1 | 1/1986 | |
| GB | 2453945 A | 4/2009 | |
| GB | 2479616 A | 10/2011 | |
| JP | H11096803 A | 4/1999 | |
| JP | H11119149 A | 4/1999 | |
| JP | H11119151 A | 4/1999 | |
| JP | H11149061 A | 6/1999 | |
| JP | 2001235801 A | 8/2001 | |
| JP | 2001305040 A | 10/2001 | |
| JP | 2001334583 A | 12/2001 | |
| JP | 2002205338 A | 7/2002 | |
| JP | 2003080604 A | 3/2003 | |
| JP | 2004037111 A | 2/2004 | |
| JP | 2005089863 A | 4/2005 | |
| JP | 2005250426 A | 9/2005 | |
| JP | 2005335199 A | 12/2005 | |
| JP | 2006500241 A | 1/2006 | |
| JP | 2006312310 A | 11/2006 | |
| JP | 2009006509 A | 1/2009 | |
| JP | 2011241450 A | 12/2011 | |
| JP | 2013022723 A | 2/2013 | |
| JP | 2014037148 A | 2/2014 | |
| JP | 5933512 B2 | 6/2016 | |
| JP | 2017110300 A * | 6/2017 | B22F 3/1055 |
| TW | 200636348 A | 10/2006 | |
| TW | 201103217 A | 1/2011 | |
| TW | 201303977 A | 1/2013 | |
| TW | 201443576 A | 11/2014 | |
| TW | 201714733 A | 5/2017 | |
| WO | WO-1992008566 A1 | 5/1992 | |
| WO | WO-1992008592 A1 | 5/1992 | |
| WO | WO-9824574 A1 | 6/1998 | |
| WO | WO-2002026478 A1 | 4/2002 | |
| WO | WO-2002036331 A2 | 5/2002 | |
| WO | WO-2002042056 A1 | 5/2002 | |
| WO | WO-2002085009 A2 | 10/2002 | |
| WO | WO-2004014636 A1 | 2/2004 | |
| WO | WO-2005080029 A1 | 9/2005 | |
| WO | WO-2006043231 A1 | 4/2006 | |
| WO | WO-2006123641 A1 | 11/2006 | |
| WO | WO-2009010034 A2 | 1/2009 | |
| WO | WO-2010083997 A2 | 7/2010 | |
| WO | WO-2012037694 A2 | 3/2012 | |
| WO | WO-2012131481 A1 | 10/2012 | |
| WO | WO-2012140122 A1 | 10/2012 | |
| WO | WO-2012151262 A2 | 11/2012 | |
| WO | WO-2014093863 A1 | 6/2014 | |
| WO | WO-2014095208 A1 | 6/2014 | |
| WO | WO-2014104083 A1 | 7/2014 | |
| WO | WO-2014167100 A1 | 10/2014 | |
| WO | WO-2014176538 A1 | 10/2014 | |
| WO | WO-2014179345 A1 | 11/2014 | |
| WO | WO-2014199134 A1 | 12/2014 | |
| WO | WO-2014199149 A1 | 12/2014 | |
| WO | WO-2014074954 A3 | 1/2015 | |
| WO | WO-2015003804 A1 | 1/2015 | |
| WO | WO-2015017077 A1 | 2/2015 | |
| WO | WO-2015025171 A2 | 2/2015 | |
| WO | WO-2015040433 A2 | 3/2015 | |
| WO | WO-2015066607 A1 | 5/2015 | |
| WO | WO-2015075539 A1 | 5/2015 | |
| WO | WO-2015086705 A1 | 6/2015 | |
| WO | WO-2015094720 A1 | 6/2015 | |
| WO | WO-2015108991 A2 | 7/2015 | |
| WO | WO-2015112723 A1 | 7/2015 | |
| WO | WO-2015114032 A1 | 8/2015 | |
| WO | WO-2015120168 A1 | 8/2015 | |
| WO | WO-2015191257 A1 | 12/2015 | |
| WO | WO-2015200138 A1 | 12/2015 | |
| WO | WO-2015134075 A3 | 1/2016 | |
| WO | WO-2016050319 A1 | 4/2016 | |
| WO | WO-2016071265 A1 | 5/2016 | |
| WO | WO-2016079496 A3 | 6/2016 | |
| WO | WO-2016088042 A1 | 6/2016 | |
| WO | WO-2016110440 A1 | 7/2016 | |
| WO | WO-2016184888 A1 | 11/2016 | |
| WO | WO-2016201309 A1 | 12/2016 | |
| WO | WO-2017075234 A1 | 5/2017 | |
| WO | WO-2017075244 A1 | 5/2017 | |
| WO | WO-2017075258 A1 | 5/2017 | |
| WO | WO-2017075277 A1 | 5/2017 | |
| WO | WO-2017075285 A1 | 5/2017 | |
| WO | WO-2017075353 A1 | 5/2017 | |
| WO | WO-2017075356 A1 | 5/2017 | |
| WO | WO-2017075408 A1 | 5/2017 | |
| WO | WO-2017075423 A1 | 5/2017 | |
| WO | WO-2017075449 A1 | 5/2017 | |
| WO | WO-2017075600 A1 | 5/2017 | |

(56) References Cited

FOREIGN PATENT DOCUMENTS

| | | |
|---|---|---|
| WO | WO-2017075231 A3 | 9/2017 |
| WO | WO-2018075087 A1 | 4/2018 |
| WO | WO-2018087218 A1 | 5/2018 |
| WO | WO-2020041786 A2 | 2/2020 |

OTHER PUBLICATIONS

Machine translation of JP2017110300A (Year: 2024).*
Peeyush Nandwana et al. Recyclability Study on Inconel 718 and Ti—6Al—4V Powders for Use in Electron Beam Melting. The Minerals, Metals & Materials Society and ASM International 2015.
Lorincz, J. Technology drives cell success. ManufacturingEngineeringMedia.com Aug. 2013; p. 61, left column, third-fourth paragraphs.
Gibson (Rapid Prototyping Journal; Bradford vol. 2, Iss. 2, (1996): 32-38) (Year: 1996).
Reference Guide: How to Combine Lasers, Sep. 20, 2012 (Year: 2012).
Purtonen, Tuomas et al., Monitoring And Adaptive Control Of Laser Processes, Science Direct, 2014.
Edmund Optics, "Relay Lenses", 2019 (Year: 2019).
International Search Report and Written Opinion regarding International Application No. PCT/US2021/056040, dated Feb. 18, 2022.
B. L, R. W, L. C, The Roadmap for Additive Manufacturing and Its Impact, 3D Print. Addit. Manuf. (2014). doi:10.1089/3dp.2013.0002.
W.E. King, A.T. Anderson, R.M. Ferencz, N.E. Hodge, C. Kamath, S.A. Khairallah, A.M. Rubenchik, Laser powder bed fusion additive manufacturing of metals; physics, computational, and materials challenges, Appl. Phys. Rev. 2 (2015) 041304. doi:10.1063/1.4937809.
W.E. Frazier, Metal additive manufacturing: a review, J. Mater. Eng. Perform. 23 (2014) 1917-1928. doi:10.1007/s11665-014-0958-z.
R. Grylls, Multiple Lasers in Metal AM a Blessing and a Bane, (n.d.). https://www.sme.org/technologies/articles/2017/march/multiple-lasers-in-metal-am-a-blessing-<https://protect-us.mimecast.com/s/xi92C8201WtXkLEKHnmETV>and-a-bane/ (accessed Jun. 2, 2020).
C. Körner, Additive manufacturing of metallic components by selective electron beam melting—a review, Int. Mater. Rev. 61 (2016) 361-377. doi:10.1080/09506608.2016.1176289.
R. Dehoff, M. Kirka, W. Sames, H. Bilheux, A. Tremsin, L. Lowe, S. Babu, Site specific control of crystallographic grain orientation through electron beam additive manufacturing, Mater. Sci. Technol. 31 (2015) 931-938. doi:10.1179/1743284714Y.0000000734.
S. Gruber, C. Grunert, M. Riede, E. López, A. Marquardt, F. Brueckner, C. Leyens, Comparison of dimensional accuracy and tolerances of powder bed based and nozzle based additive manufacturing processes, J. Laser Appl. 32 (2020) 032016. doi:10.2351/7.0000115.
M. Zavala-Arredondo, N. Boone, J. Willmott, D.T.D. Childs, P. Ivanov, K.M. Groom, K. Mumtaz, Laser diode area melting for high speed additive manufacturing of metallic components, Mater. Des. 117 (2017) 305-315. doi:10.1016/j.matdes.2016.12.095.
M.J. Matthews, G. Guss, D.R. Drachenberg, J.A. Demuth, J.E. Heebner, E.B. Duoss, J.D. Kuntz, C.M. Spadaccini, Diode-based additive manufacturing of metals using an optically-addressable light valve, Opt. Express. 25 (2017) 11788-11800. doi:10.1364/OE.25.011788.
T.T. Roehling, S.S.Q. Wu, S.A. Khairallah, J.D. Roehling, S.S. Soezeri, M.F. Crumb, M.J. Matthews, Modulating laser intensity profile ellipticity for microstructural control during metal additive manufacturing, Acta Mater. 128 (2017) 197-206. doi:10.1016/j.actamat.2017.02.025.
J.D. Roehling, W.L. Smith, T.T. Roehling, B. Vrancken, G.M. Guss, J.T. Mckeown, M.R. Hill, M.J. Matthews, Reducing residual stress by selective large-area diode surface heating during laser powder bed fusion additive manufacturing, Addit. Manuf. 28 (2019) 228-235. doi:10.1016/j.addma.2019.05.009.
T.T. Roehling, R. Shi, S.A. Khairallah, J.D. Roehling, G.M. Guss, J.T. Mckeown, M.J. Matthews, Controlling grain nucleation and morphology by laser beam shaping in metal additive manufacturing, Mater. Des. 195 (2020) 109071. doi:10.1016/j.matdes.2020.109071.
R. Shi, S.A. Khairallah, T.T. Roehling, T.W. Heo, J.T. Mckeown, M.J. Matthews, Microstructural control in metal laser powder bed fusion additive manufacturing using laser beam shaping strategy, Acta Mater. 184 (2020) 284-305. doi:10.1016/j.actamat.2019.11.053.
N. Raghavan, S. Simunovic, R. Dehoff, A. Plotkowski, J. Turner, M. Kirka, S. Babu, Localized melt-scan strategy for site specific control of grain size and primary dendrite arm spacing in electron beam additive manufacturing, Acta Mater. 140 (2017) 375-387. doi:10.1016/j.actamat.2017.08.038.
M.M. Kirka, Y. Lee, D.A. Greeley, A. Okello, M.J. Goin, M.T. Pearce, R.R. Dehoff, Strategy for Texture Management in Metals Additive Manufacturing, JOM. 69 (2017) 523-531. doi:10.1007/s11837-017-2264-3.
S.A. Khairallah, A. Anderson, Mesoscopic simulation model of selective laser melting of stainless steel powder, J. Mater. Process. Technol. 214 (2014) 2627-2636. doi:10.1016/j.jmatprotec.2014.06.001.
S.A. Khairallah, A.T. Anderson, A. Rubenchik, W.E. King, Laser powder-bed fusion additive manufacturing: Physics of complex melt flow and formation mechanisms of pores, spatter, and denudation zones, Acta Mater. 108 (2016) 36-45. doi:10.1016/j.actamat.2016.02.014.
J. Ye, S.A. Khairallah, A.M. Rubenchik, M.F. Crumb, G. Guss, J. Belak, M.J. Matthews, Energy Coupling Mechanisms and Scaling Behavior Associated with Laser Powder Bed Fusion Additive Manufacturing, Adv. Eng. Mater. 21 (2019) 1900185. doi:10.1002/adem.201900185.
S.A. Khairallah, A.A. Martin, J.R.I. Lee, G. Guss, N.P. Calta, J.A. Hammons, M.H. Nielsen, K. Chaput, E. Schwalbach, M.N. Shah, M.G. Chapman, T.M. Willey, A.M. Rubenchik, A. T. Anderson, Y.M. Wang, M.J. Matthews, W.E. King, Controlling interdependent meso-nanosecond dynamics and defect generation in metal 3D printing, Science. 368 (2020) 660-665. doi:10.1126/science.aay7830.
ALE3D for Industry (ALE3D4I), (n.d.). <https://web.archive.org/web/2021*/https://ipo.llnl.gov/technologies/software/ale3d-industry-ale3d4i> accessed Aug. 9, 2020).
N.P. Calta, J. Wang, A.M. Kiss, A.A. Martin, P.J. Depond, G.M. Guss, V. Thampy, A.Y. Fong, J.N. Weker, K.H. Stone, C.J. Tassone, M.J. Kramer, M.F. Toney, A.V. Buuren, M.J. Matthews, An instrument for in situ time-resolved X-ray imaging and diffraction of laser powder bed fusion additive manufacturing processes, Rev. Sci. Instrum. 89 (2018) 055101. doi:10.1063/1.5017236.
N.P. Calta, A.A. Martin, J.A. Hammons, M.H. Nielsen, T.T. Roehling, K. Fezzaa, M.J. Matthews, J.R. Jeffries, T.M. Willey, J.R.I. Lee, Pressure dependence of the laser-metal interaction under laser powder bed fusion conditions probed by in situ X-ray imaging, Addit. Manuf. 32 (2020) 101084. doi:10.1016/j.addma.2020.101084.
A.A. Martin, N.P. Calta, S.A. Khairallah, J. Wang, P.J. Depond, A.Y. Fong, V. Thampy, G.M. Guss, A.M. Kiss, K.H. Stone, C.J. Tassone, J.N. Weker, M.F. Toney, T. van Buuren, M.J. Matthews, Dynamics of pore formation during laser powder bed fusion additive manufacturing, Nat. Commun. 10 (2019) 1-10. doi:10.1038/s41467-019-10009-2.
A.A. Martin, N.P. Calta, J.A. Hammons, S.A. Khairallah, M.H. Nielsen, R.M. Shuttlesworth, N. Sinclair, M.J. Matthews, J.R. Jeffries, T.M. Willey, J.R.I. Lee, Ultrafast dynamics of laser-metal interactions in additive manufacturing alloys captured by in situ X-ray imaging, Mater. Today Adv. 1 (2019) 100002. doi:10.1016/j.mtadv.2019.01.001.
A.B. Spierings, M. Schneider, R. Eggenberger, Comparison of density measurement techniques for additive manufactured metallic parts, Rapid Prototyp. J. (2011). doi:10.1108/13552541111156504.
C.D. Boley, S.A. Khairallah, A.M. Rubenchik, Calculation of laser absorption by metal powders in additive manufacturing, Appl. Opt. 54 (2015) 2477-2482. doi:10.1364/AO.54.002477.

(56) References Cited

OTHER PUBLICATIONS

C.D. Boley, S.C. Mitchell, A.M. Rubenchik, S.S.Q. Wu, Metal powder absorptivity: modeling and experiment, Appl. Opt. 55 (2016) 6496-6500. doi:10.1364/AO.55.006496.

M.J. Matthews, G. Guss, S.A. Khairallah, A.M. Rubenchik, P.J. Depond, W.E. King, Denudation of metal powder layers in laser powder bed fusion processes, Acta Mater. 114 (2016) 33-42. doi:10.1016/j.actamat.2016.05.017.

R.S. Craxton, K.S. Anderson, T.R. Boehly, V.N. Goncharov, D.R. Harding, J.P. Knauer, R.L. Mccrory, P.W. Mckenty, D.D. Meyerhofer, J.F. Myatt, A.J. Schmitt, J.D. Sethian, R.W. Short, S. Skupsky, W. Theobald, W.L. Kruer, K. Tanaka, R. Betti, T.J.B. Collins, J.A. Delettrez, S.X. Hu, J.A. Marozas, A.V. Maximov, D.T. Michel, P.B. Radha, S.P. Regan, T.C. Sangster, W. Seka, A.A. Solodov, J.M. Soures, C. Stoeckl, J.D. Zuegel, Direct-drive inertial confinement fusion: A review, Phys. Plasmas. 22 (2015) 110501. https://doi.org/10.1063/1.4934714.

European Patent Office, Supplemental European Search Report for corresponding European Patent Application No. 21898879.8 mailed May 22, 2024, 11 pages.

\* cited by examiner

500 μm

Experimental results of pulsed melting of 54μm diameter powder

SYSTEM AND METHOD FOR LARGE-AREA PULSED LASER MELTING OF METALLIC POWDER IN A LASER POWDER BED FUSION APPLICATION

CROSS-REFERENCE TO RELATED APPLICATIONS

This application claims the benefit of U.S. Provisional Application No. 63/118,376, filed on Nov. 25, 2020. The disclosure of the above application is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to additive manufacturing systems and methods, and more particularly to systems and methods for reducing the time to manufacture 3D parts through a laser powder bed fusion (LPBF) process by simultaneously melting metal powder over a large area in part through multiple laser pulses of differing durations that serve to both preheat a substrate, and then to fully melt the powder particles and the substrate, while taking into account powder particle size, to achieve significantly improved molten material flow and surface smoothness of a resulting surface.

BACKGROUND

The statements in this section merely provide background information related to the present disclosure and may not constitute prior art.

Metal additive manufacturing (AM) has great potential to enhance manufacturing capabilities in numerous industries. AM can produce geometries that are impossible to fabricate in a part with subtractive techniques, and can reduce the amount of waste material produced during manufacturing, reducing costs. Nonetheless, metal AM has not yet gained significant market share in high-volume manufacturing because of the current limitation to the speed of the process, which strongly affects the production price per piece that can be achieved. The speed at which parts can be built is limited to how fast material can be melted and solidified into the underlying part. Practically speaking, the rate at which 3D parts can be made is slow. This of course, has significant implications on the economy of mass production.

Large-area printing can help mitigate this bottleneck as a powder area on the order of 1 mm-2 mm (or possibly even more, depending on the diode or laser source used) is consolidated at a time. In a typical laser powder bed fusion (LPBF) process the parts are built in a serial fashion. With the LPBF process a focused laser source melts and fuses the powder into the underlying part/substrate. The laser scans back and forth to create a line of added material, and multiple lines are repeated to create a layer. The rate at which each layer of a 3D metal part can be produced is limited by how fast material can be melted and fused into the underlying substrate. The heat source, which is typically a laser, has to perform multiple single scans, each around ~50-100 micrometer in width to consolidate a ~30-50 micrometer thick single layer of material. Multiple heat (e.g., laser) sources and more laser power can increase build speeds but add additional controls challenges. Keeping multiple lasers aligned and equally utilized is a very significant engineering challenge. A parallel process where large areas of the powder could be melted and added to the part simultaneously could greatly increase the build speed of LPBF processes. Other approaches to improving overall speed of manufacture of 3D AM constructed parts that various other manufacturers are exploring is to allow for multiple lasers to work simultaneously on different parts of the object being built. Of course, such approaches also come with added costs and the challenge of synchronizing operation of multiple heat sources working on different areas of material within a layer of the part being formed.

Another type of metal AM process, Electron Beam Melting (EBM), rasters an electron beam at sufficient speed to mimic a large area heat source. However, EBM suffers from the need to operate in a vacuum, as well as the need to pre-sinter relatively coarse metal powder feedstock material. These factors lead to rougher surfaces and a generally larger minimum feature size compared to laser processing. To date, however, there have been only a few demonstrations of parallel processing in laser-based AM. Single lines of laser diode arrays, modulating the intensity of a line laser, and altering the intensity distribution of the laser to melt large areas simultaneously, have both been demonstrated. The former method has the advantage of simplicity, in that it could potentially operate by moving the heat sources over the build plate in a single pass. The latter method has the advantage that the entire build plate could be processed in a single step, or smaller areas, melted in sequence. The second advantage to this process is that custom thermal profiles could be applied to the melted material on a voxel by voxel basis, possibly controlling microstructure, composition, grain orientation/texture, or residual stresses.

SUMMARY

This section provides a general summary of the disclosure, and is not a comprehensive disclosure of its full scope or all of its features.

In one aspect the present disclosure relates to a system for performing large area laser powder bed fusion (LBPF) to form a plurality of layers of a 3D part in a layer-by-layer fashion using meltable powder particles. The system may comprise a first light source for generating a first light pulse of a first duration, the first light pulse operating to preheat a substrate underneath a new layer of powder particles, wherein the substrate is formed from a previously fused quantity of the powder particles. The system may also include a second light source for generating a second light pulse subsequent to the generation of the first light pulse. The second light pulse has a duration shorter than the first duration by a factor of at least about 10, and fully melts the new layer of powder particles in addition to the substrate, which achieves a smooth printed layer. A wavelength of the first light pulse differs from a wavelength of the second light pulse.

In another aspect the present disclosure relates to a system for performing large area laser powder bed fusion (LBPF) to form a plurality of layers of a 3D part in a layer-by-layer fashion using meltable powder particles. The system may comprise a first light source for generating a first light pulse of a first duration, with the first duration being between 10 us and 100 ms in some embodiments. In other embodiments the duration may be between 10 us and 10 ms, and in yet other embodiments it may be between 100 us and 100 ms. The first light pulse operates to preheat a substrate underneath a new layer of powder particles, wherein the substrate is formed from a previously fused quantity of the powder particles. The system includes a second light source for generating a second light pulse subsequent to the first light pulse. The second light pulse has a second duration between 10 ns and 10 us. The first light pulse has a first power level and the second light pulse has a second power level. An intensity of the second pulse is on the order of at least about 10 times an intensity of the first light pulse. The second light pulse serves to fully melt the new layer of powder particles in addition to the substrate, to achieve a smooth printed layer.

In still another aspect the present disclosure relates to a method for performing large area laser powder bed fusion (LBPF) to form a plurality of layers of a 3D part in a layer-by-layer fashion using meltable powder particles. The method may comprise configuring the meltable powder particles in a new material layer no more than about 50 um in thickness on a substrate. The substrate may be a previously fused material layer formed from the meltable powder particles. The method may further include generating a first light pulse of a first duration. The first light pulse operates to preheat the substrate underneath the new material layer of powder particles. The method may further include generating a second light pulse of a second duration shorter than the first duration by a factor of at least about 10. The second light pulse operates to fully melt the new layer of powder particles in addition to fully melting the substrate, to achieve a smooth printed layer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems and methods for simultaneously melting large areas of metal powder into a substrate (i.e., a parallel process) via a large area pulsed laser. The present disclosure further significantly builds on the understanding of the co-inventors' with regard to high speed imaging techniques and high-fidelity physics.

Figure 1:
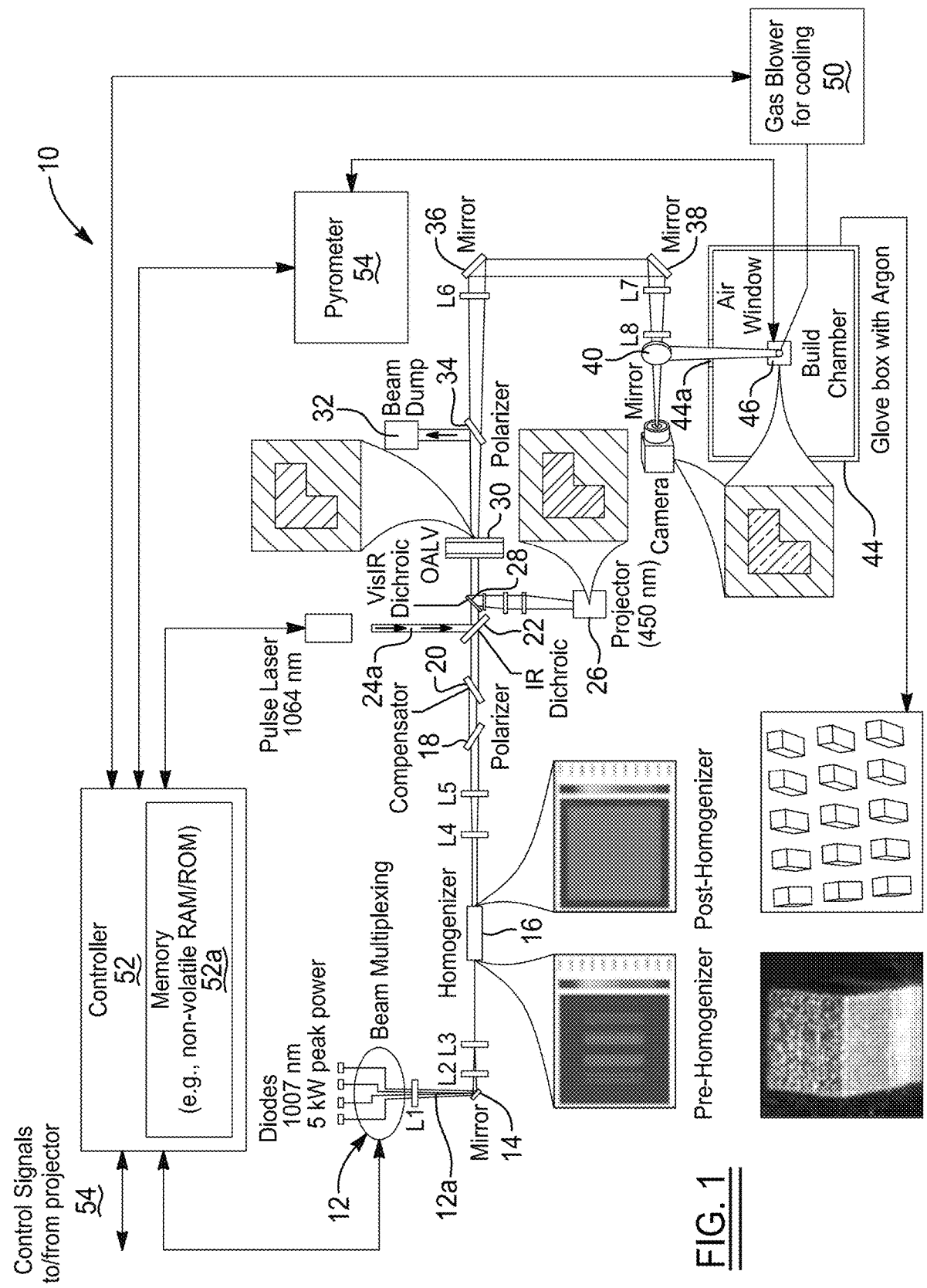
FIG. 1 is a high level simplified block diagram of one system in accordance with the present disclosure for performing large area LBPF printing.

FIG. 1 shows one embodiment of a system 10 for forming performing large area laser powder bed fusion (LPBF) to form a 3D part. The system 10 has also helped to reveal and explain important factors in LBPF such as melting, powder consolidation, and defect generation processes in more detail. In this case 316L stainless steel powder was used as a baseline material. The system 10 model includes components for controlling a plurality of important aspects (e.g., physics) when carrying out a LPBF process, including multiple laser reflections, melt flow, and vapor and liquid ejection effects.

In FIG. 1, the system 10 in this embodiment includes a first light source 12, a first mirror 14, a beam homogenizer 16, a polarizer 18, a compensator 20 a first dichroic element 22, a second light source 24, a third light source 26, a second dichroic element 28, an optically addressable light valve 30, a beam dump 32, a second polarizer 34, a second mirror 36, a third mirror 38, a fourth mirror 40, a camera 42 and a glove box 44. The glove box 44 is a chamber which in this example is filled with a gas, in one example argon, and has a small window 44a through which an optical signal may be directed onto a build plate 46 positioned within the glove box 44. A plurality of focusing lenses L1-L8 are provided in the path of the optical signals being transmitted into the glove box 44 for focusing the optical signals being directed into the glove box 44. Preferably, a gas blower subsystem may be included in the glove box 44 to provide a cool/cold gas (e.g., air) flow for rapidly cooling a just-melted area of the layer. A controller 52 having a memory 52a (e.g., non-volatile RAM and/or ROM) may be in communication with the first light source 12, the second light source 24, and the air blower subsystem 50 to control these subsystems, or alternatively two or more separate controllers may be implemented to control these components and/or other components of the system 10. Optionally, a pyrometer 54 may be used to thermally monitor the surface of the material layer being melted and provide feedback to the controller 52 or to a different component, to detect if plasma occurs during the melting process, and thus to better help control the melting process.

The system 10 uses the first light source 12 to form a pre-heating laser to generate an optical beam 12a. The pre-heating laser, in one exemplary embodiment, may consist of a set of diode lasers. The second light source 24 may, in one embodiment, be a pulsed laser, which produces a pulse 24a which serves to melt and fuse the metal powder to the underlying substrate. The wavelengths of the two lasers 12 and 24 should be sufficiently separated such that they can be combined into the same path via an optical element, such as the dichroic element (i.e., mirror) 22. The pulse from the pre-heating laser 12 is typically much less intense and longer than the pulsed laser in order to sufficiently heat the substrate just below the melting point of the material. After combining the laser light from both lasers 12 and 24, it is then passed through a beam shaping element, such as the optically addressable light valve 30, as to select the area of the beam that will be passed through to the build plate 46, with the rest of the light not directed at the build plate being rejected or recycled. The power profiles (laser intensity), spatial profile, exposure time may be controlled as needed. The pyrometer 54 can be used to detect abnormal/non-optimal process conditions. In place of the pyrometer 54, a spectrometer, photodiode or any other suitable component can be used singly or in conjunction with the pyrometer 54 to detect abnormal/non-optimal process conditions.

As noted above, the first light source 12 may be formed in one example by a plurality of diode lasers (hereinafter referred to simply as "diode laser subsystem 12", for convenience) that generate the optical beam 12a, which performs the pre-heating of the powder material. In one implementation the diode laser subsystem 12 provides an optical beam 12a forming a pulse with a 5 kW peak power output at a suitable wavelength. In one embodiment the wavelength of the pulse formed by the optical beam 12a may be about 1007 nm. The pulse duration of each pulse formed by the optical beam 12a may vary between at least about 100 µs and 100 ms. The optical beam 12a may have an intensity of preferably between about 1 kW/cm$^2$-20 kW/cm$^2$. The beam homogenizer 16 operates to smooth out the intensity of the optical beam 12a which is being fed to the glove box 44. The polarizer 18 serves to remove the unwanted portion of the laser area (i.e., the unwanted portion of the beam 12a) and the compensator 20 operates to any correct beam distortions.

The second light source 24 in this example may be a pulsed laser, and will hereinafter be referred to for convenience as the "pulsed laser 24". The pulsed laser 24 in one example produces a short duration pulsed light beam 24a having a desired wavelength, which in one example may be a wavelength of about 1064 nm. The wavelength of the pulsed light beam 24a needs to be different from the wavelength of the pulses which form the optical beam 12a, preferably by at least about 10-20 nm, so that these two optical pulses can be combined by the dichroic element 22. The duration of the pulsed light beam 24a may be typically between about 10 ns and 10 µs, or in other words significantly shorter than the duration of the optical pulse formed by beam 12a from the diode laser subsystem 12, and more preferably shorter by a factor of at least about 10. The peak power level of each of the pulses that form the pulsed light beam 24a will be dependent on installed laser power and may vary considerably with each specific implementation of the system 10. The intensity of the pulsed light beam 24a is preferably in a range of about 0.2 MW/cm$^2$-2,000 MW/cm$^2$, or preferably higher by a factor of about 10 than the pre-heating optical beam 12a.

It will be appreciated that the exact wavelengths selected for the optical beams 12a and 24 can vary even more significantly than the 10 nm-20 nm minimum recited above, and they are restricted primarily by what physical optics are being used with the system 10. The beam 24a (i.e., pulse) impinges the first dichroic element 22, which in one example is an infrared (IR) dichroic element and is reflected along a light transmission path coaxial with the beam 12a from the diode laser subsystem 12, and ultimately to the surface of the powder layer on the build plate 46.

The OALV 30 may be by controlled by the optical signals generated by the third light source 26 to select specific pixels or regions of pixels of powder material, forming an image, which is to be melted. The third light source 26 in the system 10 may be a light projector (hereinafter simply "light projector 26"). In one embodiment the light projector 26 may generate an optical signal having a predetermined wavelength to activate the liquid crystal of the OALV 30. The wavelength of the optical signal from the light projector 26 may vary to meet the needs of a specific application, but in one example the wavelength may be about 450 nm. The light projector 26 provides the optical control signals that are applied via the visible IR dichroic element 28 to control the image produced by the OALV 30. The pulses from both the diode laser subsystem 12 and the pulsed laser 24 pass through the polarizer 34 and are directed via mirrors 36, 38 and 40 into the glove box 44 through the air window 44a to illuminate the powder material layer supported on the build plate 46.

In using the system 10 to carry out experiments, the co-inventors were mindful that possibly the main obstacle in producing certifiable 3D printed parts using a large area LBPF approach is the challenge in obtaining high densification (>99%). The system 10 addresses this challenge with a unique approach. The large-area printing carried out using the system 10 consists of a laser pre-heat stage, carried out using the diode laser subsystem 12 followed by the pulsed laser 24. The pre-heat laser beam 12a should have a low enough intensity, and of long enough duration to avoid spatter (>10 us), which can produce pore defects in the final part. The applied pulse of the pulsed optical beam 24a from the pulsed laser 24 should have low enough power to avoid plasma formation, in order to avoid denudation of the surrounding powder, which can prevent the stitching of areas to form larger objects. Another challenge is that the overall laser heat provided by the diode laser subsystem 12 (for pre-heating) and the pulsed laser 24 (for complete fusing) should be able to melt the substrate under the powder (i.e., that layer portion that was fused in forming the previous material layer) in order to achieve a newly formed, flat printed layer. Because the powder tends to absorb more strongly than the substrate and there are fewer paths for thermal conduction in the powder, the powder heats more quickly than the substrate. This makes heating of the substrate especially challenging. As observed during experiments, sufficient heating of the substrate is needed to avoid defect (i.e., pore) formation along the build direction in the finished material layer. These defects prevent achieving full metal density and can lead to cracking and mechanical failure of the finished part.

The present disclosure explains how the following summary of factors or processes represent key aspects that may be controlled using the system 10 to significantly improve the density of builds and advance large-area printing LBPF processes:

Process 1: Add a thin layer of small powder (~30 um). The thin layer will have low packing density, which allows the laser rays to easily penetrate the metal powder and to interact directly with the substrate below the powder. This helps the pre-heating stage in keeping the substrate at a sufficiently high temperature so that during the pulsed laser stage (i.e., application of the pulse 24a from the pulsed laser 24), the substrate can melt. Being able to melt the substrate allows the surface tension to flatten the molten powder and therefore form a more flat and uniform surface devoid of deep pits and pores. Using small powder size speeds up the melting process and requires less power since less energy is required to melt a smaller volume.

The thickness of the powder layer can also be expressed as being, in one implementation of the system 10, preferably no greater than about 1.5 times an average diameter (or thickness) of the powder particle distribution. In another implementation the thickness of the powder layer may be no greater than about 2.0 times the average diameter (or thickness) of the powder particle distribution. In another implementation of the system 10 the thickness of the layer may be no greater than about 3.0 times the average powder particle distribution. In another implementation of the system 10 the thickness of the layer may be no greater than about 1.0 times the average powder particle distribution. By the term "average diameter or thickness of the powder particle distribution" it is meant the average diameter or thickness of all of the particles of powder making up a given quantity of the powder.

Process 2: Using a lower laser wavelength is more efficient than higher laser wavelength at coupling to both the powder and the substrate. One suitable wavelength is at 1.064 m, although using a green or blue laser with a shorter wavelength may further improve absorptivity and therefore melting of the substrate.

Process 3: A variant to process 1 is to use a thin layer of large powder (~50-100 μm). The packing density will again be naturally low, since higher packing densities are achieved by mixing small and large particles. Again, the benefit of low packing density follows from the same explanation as presented above, that being that the light rays will penetrate the powder better due to less ray reflections, thus leading to better heating and melting of the substrate.

Process 4: The laser pulse should be stretched longer in time instead of being applied over a very short time interval. Whether using small powder or large powder, the consideration of the laser pulse time interval is still important.

Process 5: Using thermal sensors (e.g., pyrometer) that can detect the increase in surface temperature, a threshold can be defined so as to prevent too much energy deposition. Two wavelength pyrometry thermal monitoring may be even more suitable, since this technique is less sensitive to plasma flashes. However, even just using a photodiode may be sufficient to observe when plasmas happen. In combination with this feedback process, the gas blower 50 may be used to bring in a cool gas flow (e.g., possibly cold air) over the melting surface to speed up the cooling process and prevent uneven liquid surface motion due to Marangoni flow. The simulations described herein show that an increase in heat conductivity above the liquid surface by a factor of 10 helped ease down the strong boiling and hence stabilized the melt. Another significant benefit to gas blowing is to increase the thermal undercooling and promote equiaxed grains in the finished part.

Process 6: Another mode of operating the pulsed laser 24 is to apply two or more low power long period pulses (similar to process 4), or more generally put, arbitrary pulse shaping to optimize the melting on a material composition dependent basis. This helps circumvent the generation of spatter due to plasma formation, as well as allow the temperature of the substrate to rise quickly during the first pulse, while the powder starts to melt, but without much deformation. During the period separating the first two pulses, the powder particle point contact with the substrate softens, but the surface tension does not have enough time to spread the particles over the substrate. The second pulse is longer and is able to melt the substrate and boil the top portion of the melted or partially melted powder particles. This fast boiling gives rise to a high vapor recoil pressure that flattens the powder onto a melting substrate. The amount of laser power is estimated given the current surface temperature, as monitored experimentally, and the size of the powder.

Process 7: Using a single pulse laser with a thin layer of powder may not always be optimal. FIG. 6, discussed herein below, shows the results when a single pulse was applied over a bed of large powder particles with low packing density (30%). The large-area printing is not optimal since the consolidated layer is not uniform/flat. Instead, utilizing smaller particles that are easier to melt, does solve the problem as shown in FIG. 7. The downside is that smaller particles decrease the throughput of the printing process, unless the diode laser subsystem 12 is applied over a much large area to compensate for the very thin layer introduced by using thin powder bed of predominantly small powder particles (~30 μm).

Figure 2A:
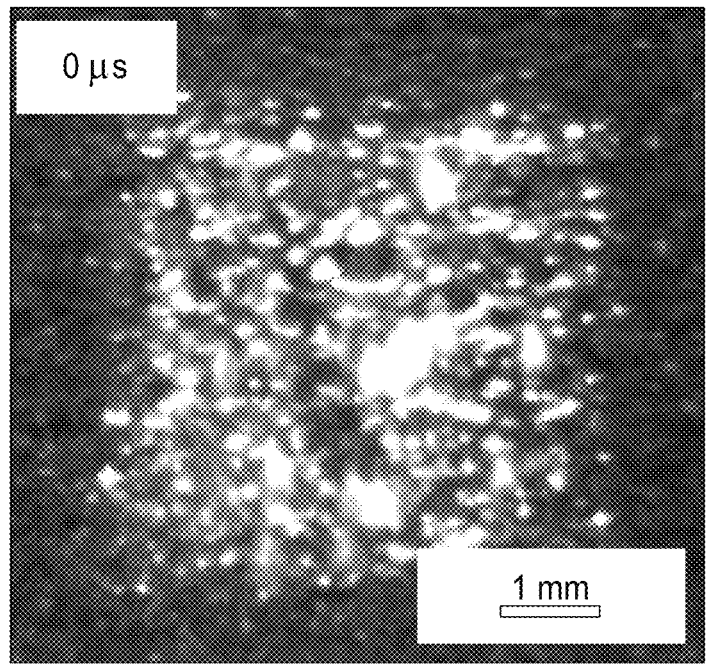
FIGS. 2a-2h represent frames of a high speed imaging movie to help illustrate how melting occurs during the conventional LBPF process.
Figure 2B:
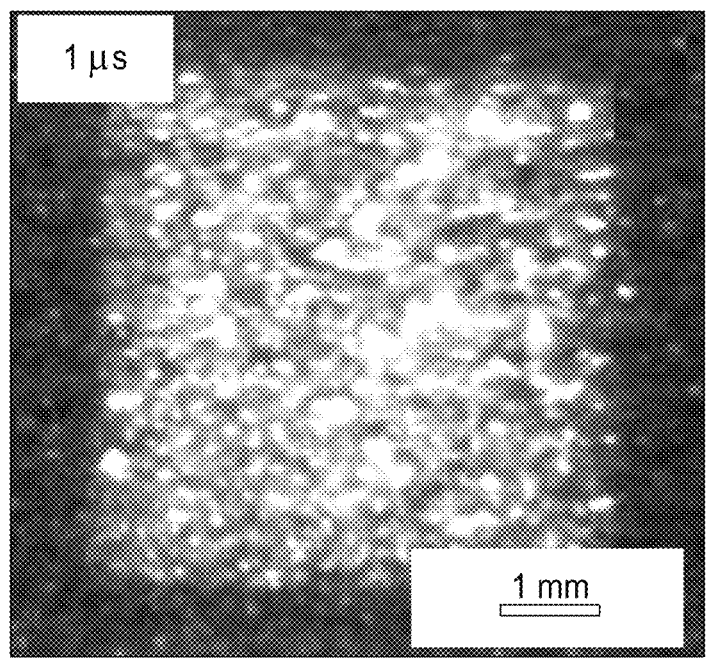
Figure 2C:
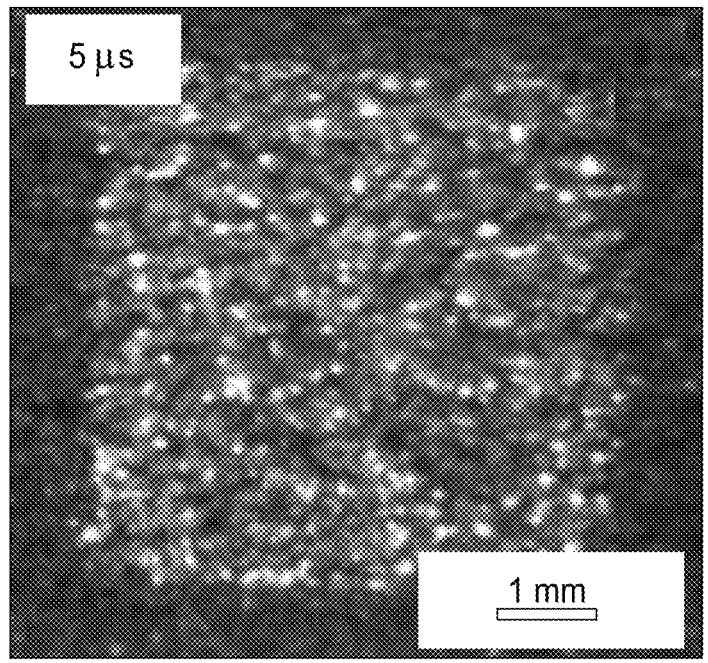
Figure 2D:
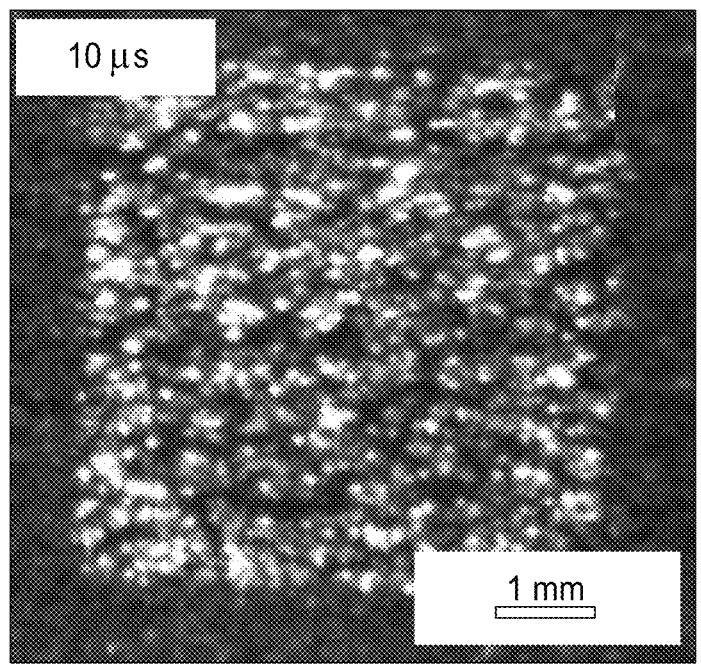
Figure 2E:
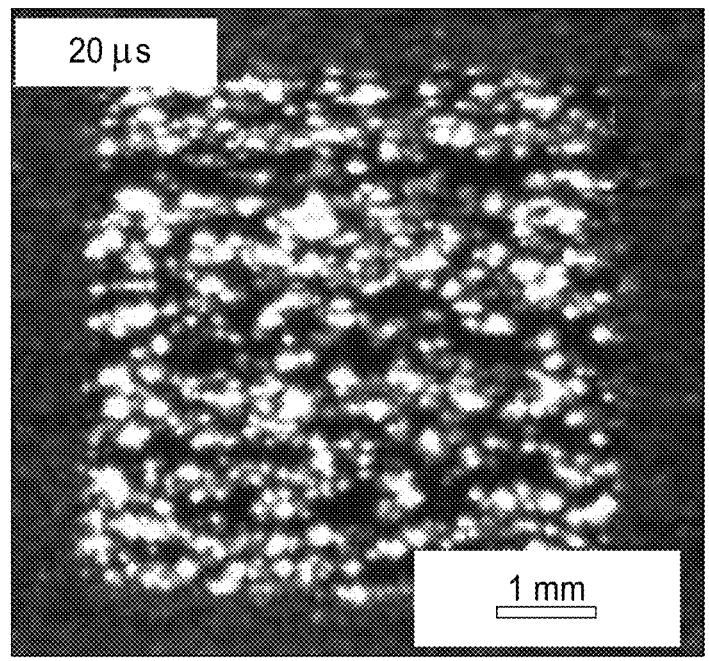
Figure 2F:
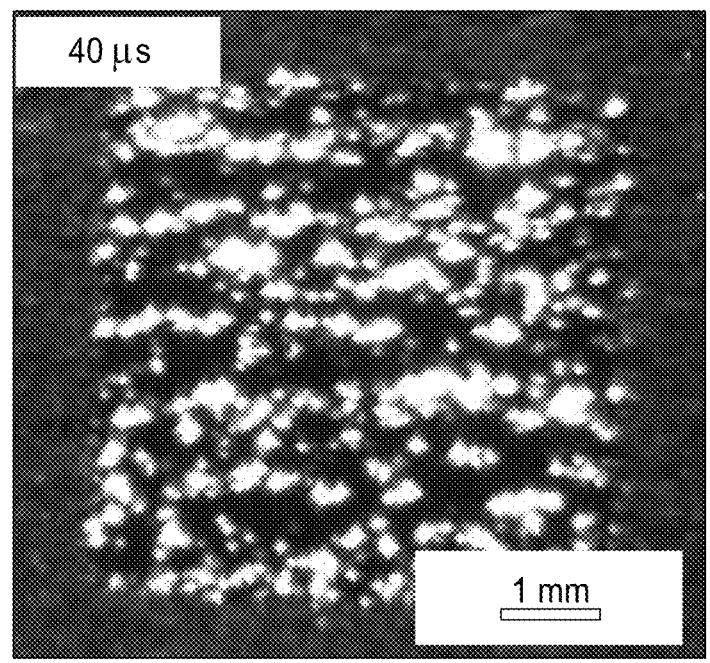

Predictive simulations shown in FIGS. 2a-2f illustrate the different stages of the melting and defect pit formation due to surface liquid migration. A 50 μm thick layer of 35 μm diameter powder particles was used as the starting layer. The powder particles reach the melting temperature at the end of the pulse (FIG. 2b) and coalescence occurs immediately thereafter. Liquid motion is essentially finished at 100 μs (FIG. 2e). The pit defects are formed by this time but solidify later. As solidification continues a hill-type defect begins to form in the center of the liquid as surface tension and fluid flow draw liquid into the center (FIGS. 2e and 2f).

Various experiments were performed using the system 10 in connection with the inert gas environment glove box 44. The first light source 12 (e.g., set of diode lasers operating at 1000 nm, hereby the "diode laser subsystem 12") served to preheat the area of the build plate 46 having on it the metal powder to be melted, and a pulsed laser 24 (e.g., Nd:YAG operating at 1064 nm) was used for the final melting of the metallic powder. Although the experimental setup has the capability to change the shape of the illuminated area to achieve arbitrary geometries, in this work a square patch of uniform intensity was used for simplicity.

High speed imaging was performed viewing through the exterior window 44a of the glovebox 44 onto the mirror 40, which in this implementation forms a long-pass dielectric mirror angled to view the substrate and to filter/reduce the collected intensity from the diode laser subsystem 12 and the pulse laser 24.

Figure 2G:
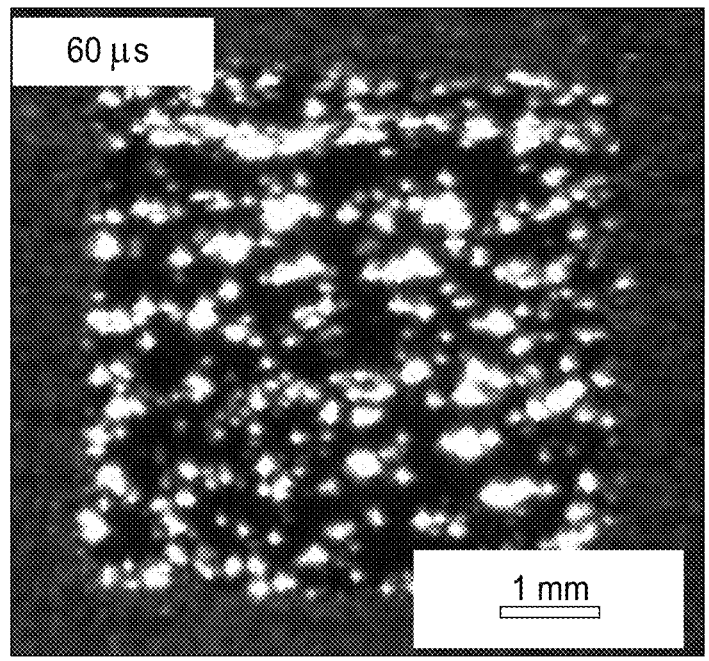
Figure 2H:
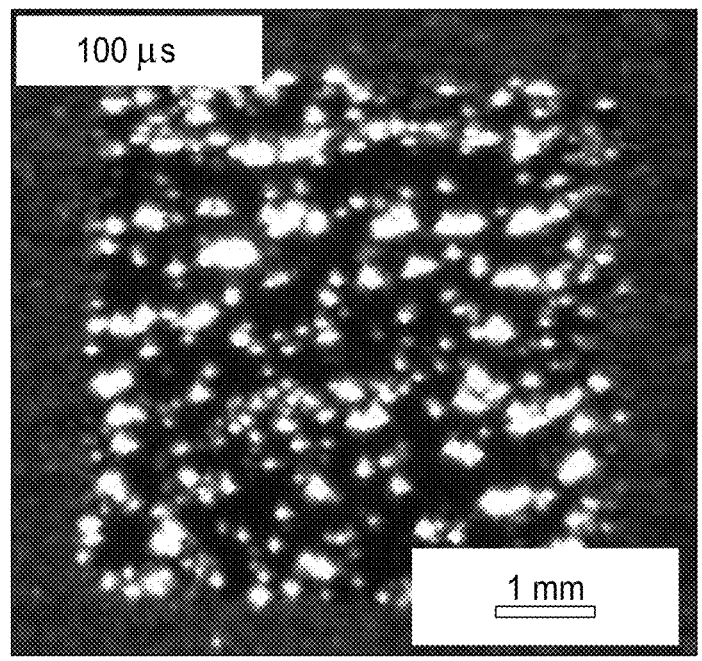

The melting of stainless steel 316L powders of the size range 15-32 μm (27 μm) and a typical layer thickness of 40 μm was captured by high speed imaging, shown in FIGS. 2a-2h. Imaging began shortly before the arrival of the Nd:YAG pulsed laser. An outline of the Nd:YAG pulsed laser (which forms the pulsed laser 24) illumination can be seen in FIGS. 2a and b as the illumination from the diode laser subsystem 12 ramps down. The pulsed laser 24 comes on immediately after the first frame (i.e., in FIG. 2b). The powder was seen to melt rapidly and proceeded to coalesce into larger droplets up until 40 μs (FIGS. 2c-2g), and eventually into some wide areas of liquid, as seen by the dark areas between 40 and 100 μs (FIGS. 2g-2h). After approximately 100 μs the liquid was virtually quiescent and begun to solidify. Hill-like features are evident as bright spots and pit-like features as grey spots, as visible in FIG. 2h. In FIG. 2h the dark areas indicate areas in which the metal was relatively flat and did not appreciably scatter light back into the camera 42 lens. Note there was no ejection of liquid spatter observed in any of the frames. This was typical during this process. Cross-sections indicated that depth of melt into the substrate was approximately 5-10 μm in these experiments.

A high-fidelity multi-physics model was used to understand the physics involved in the pulsed melting process. This model incorporated ALE3D, a predictive code, as verified by in-situ X-ray and other diagnostics experiments. A 500 μm×500 μm illuminated area was simulated to determine the effects of powder size and distribution on the process. These simulations are shown in FIG. 3. To reduce the computational cost of simulating the pre-heating from the diode laser 12, the initial temperature was set to 1633° K (the surface temperature predicted by a 1D thermal model) and the surface heated by the diode laser subsystem 12 for 150 μs to establish the temperature gradients that would be present from the pre-heating step.

The simulation in FIG. 3 was set up to resemble conditions from the high-speed data shown in FIG. 2, and used metal powder particles having a diameter of about 35 μm spread into a layer thickness of about 50 μm. Overall, our simulations and high speed imaging were remarkably similar. FIG. 3a shows the temperature distribution before the start of the pulse laser 24. At 2 μs (FIG. 3b), the top of the powder is at boiling temperature, indicated by the black contours. Similar to what has been observed in experiments and simulations for traditional LPBF, vapor ejection due to liquid metal at the boiling point caused a downward force in the liquid. This caused the molten powder particles to deform and flatten out, thus increasing the particle radius and allowing necks to form between adjacent particles that were not previously touching (FIG. 3c). The action from the vapor pressure served to consolidate the powder into a more fully cohesive layer. Thereafter, the coalescence of molten particles began and continued until about 30 μs (FIG. 3d). The liquid then began to spread out into all the areas where it was able to wet the surface.

Figure 3A:
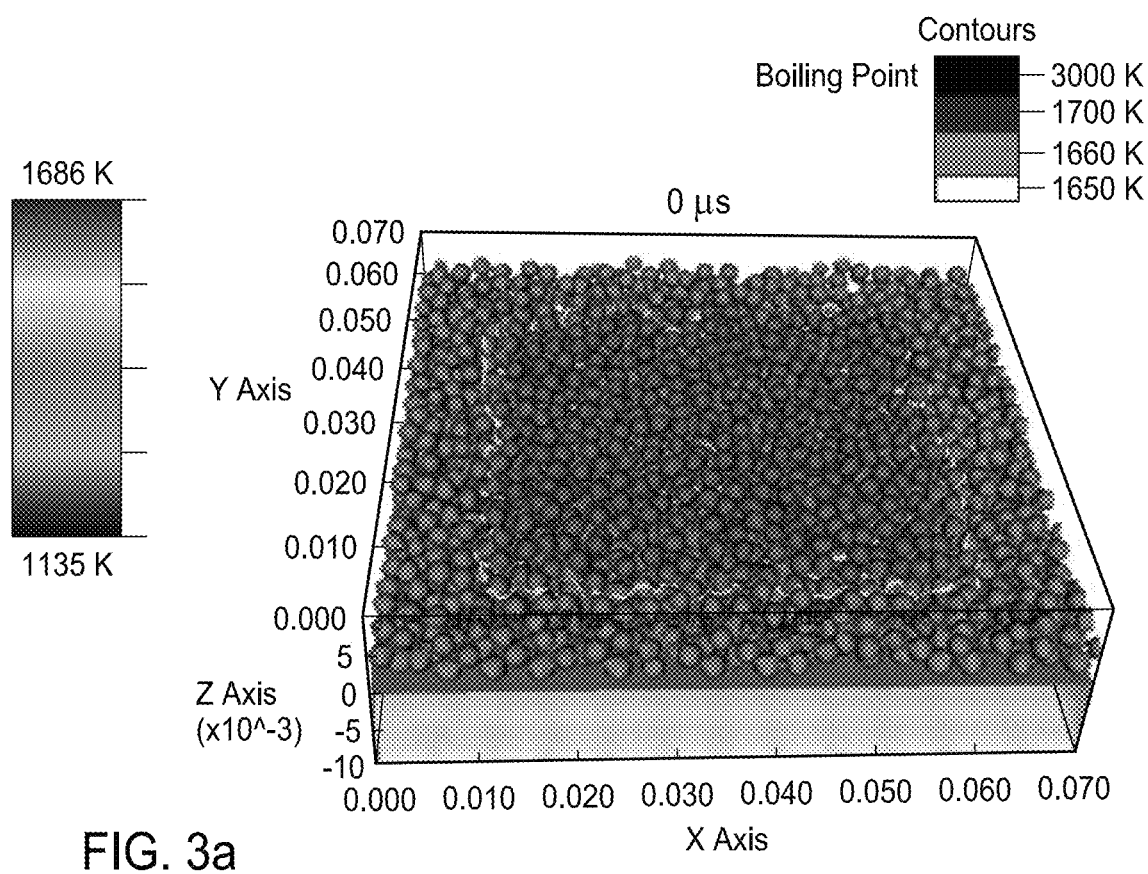
FIGS. 3a-3f represent simulations using an ALE3D model showing different stages of flow dynamics when melting 35 μm powder particles in a 50 um thick layer.
Figure 3B:
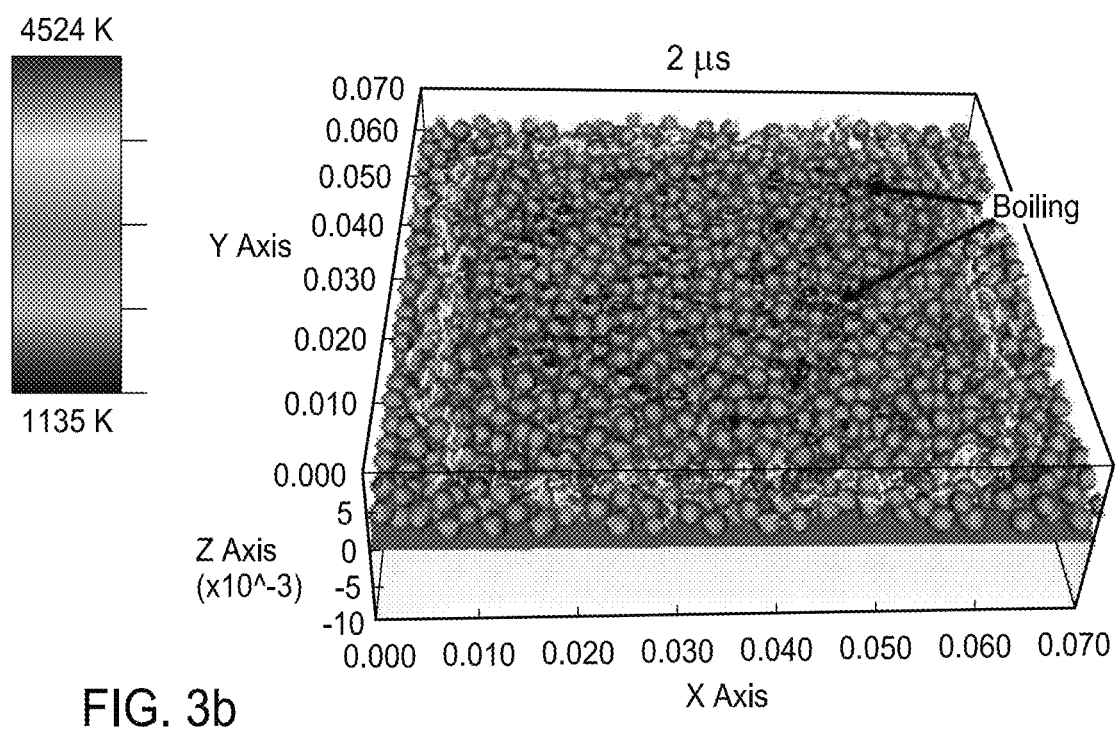
Figure 3C:
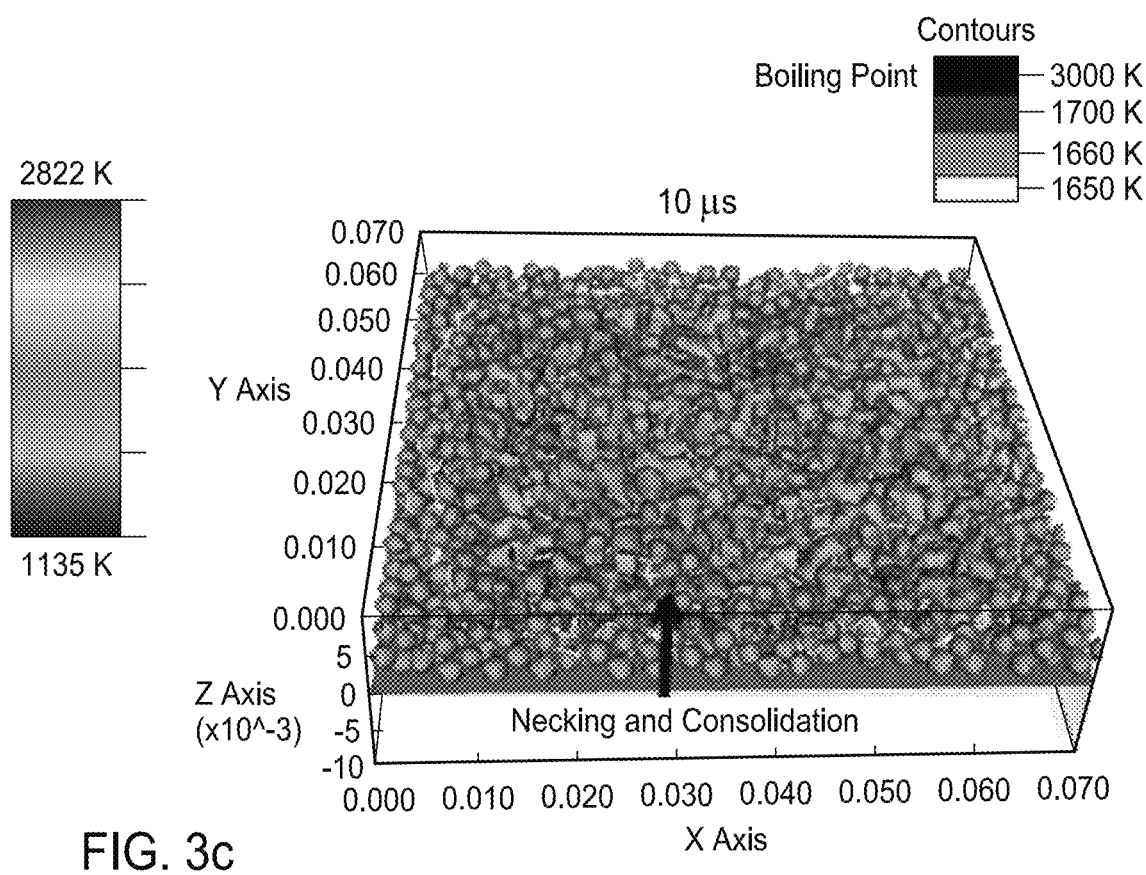
Figure 3D:
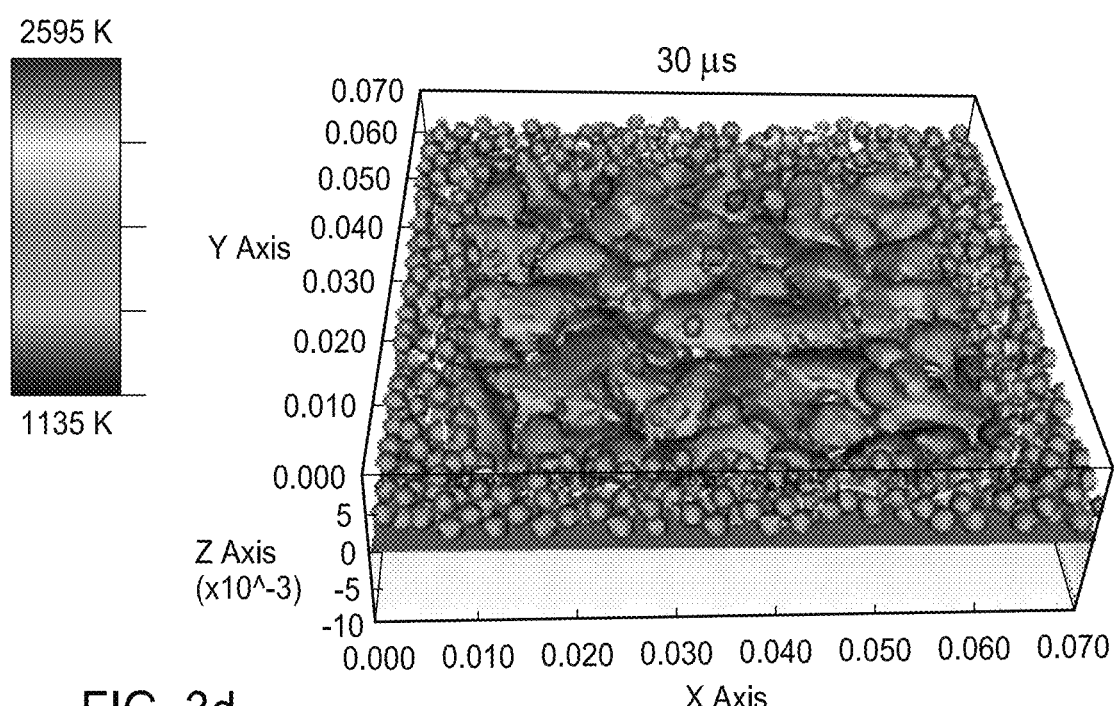
Figure 3E:
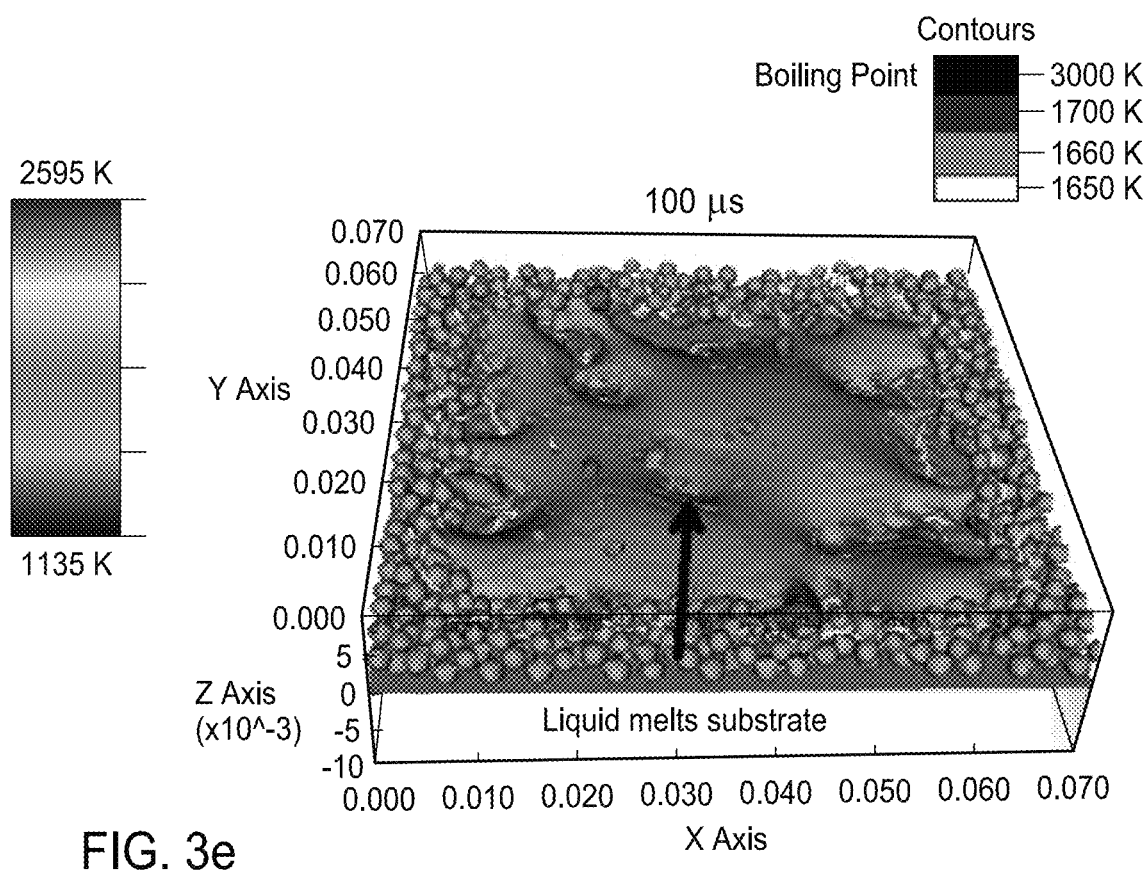
Figure 3F:
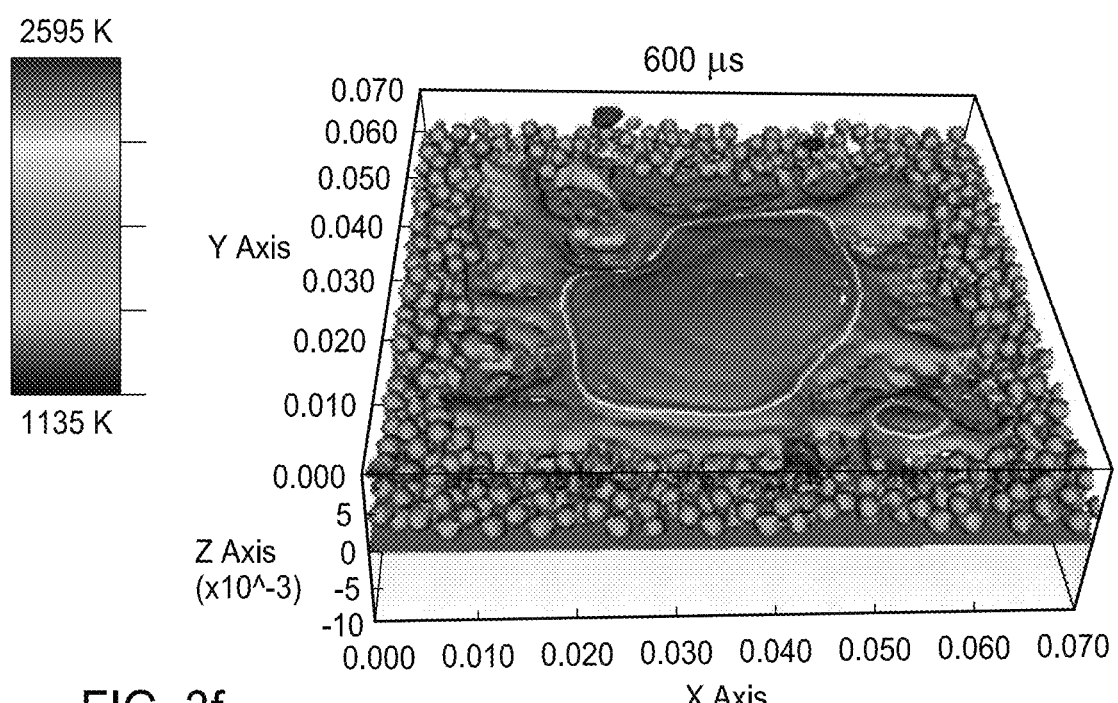
Figure 4A:
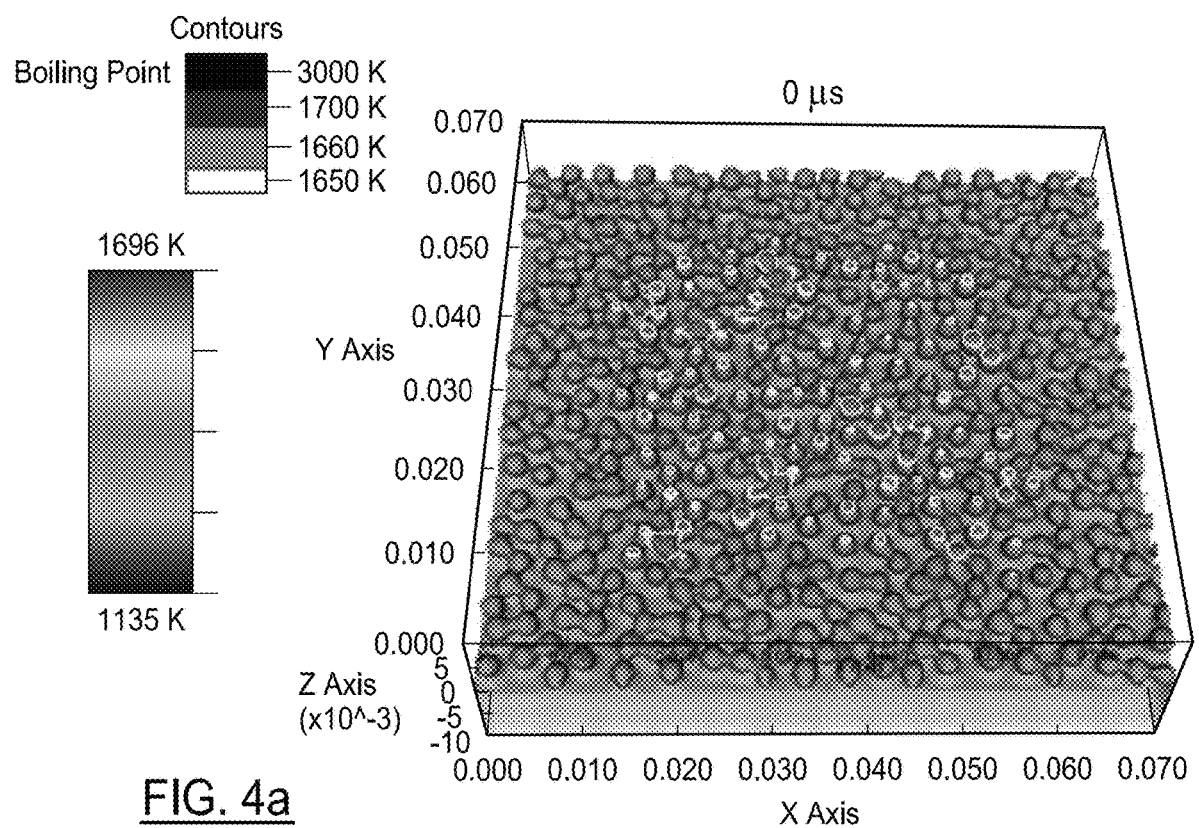
FIGS. 4a-4f illustrate multiphysics simulations using about 35 μm sized particles in a 35 um thick layer, which show the different stages of melting dynamics.
Figure 4B:
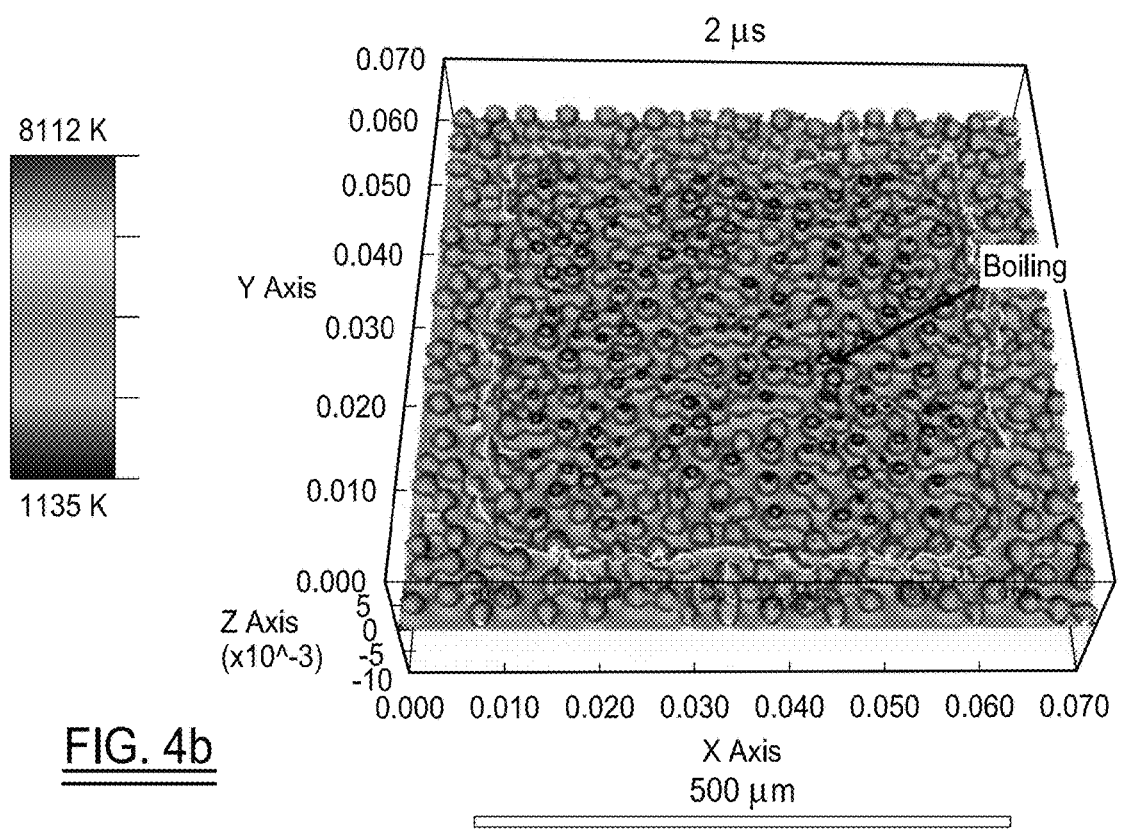
Figure 4C:
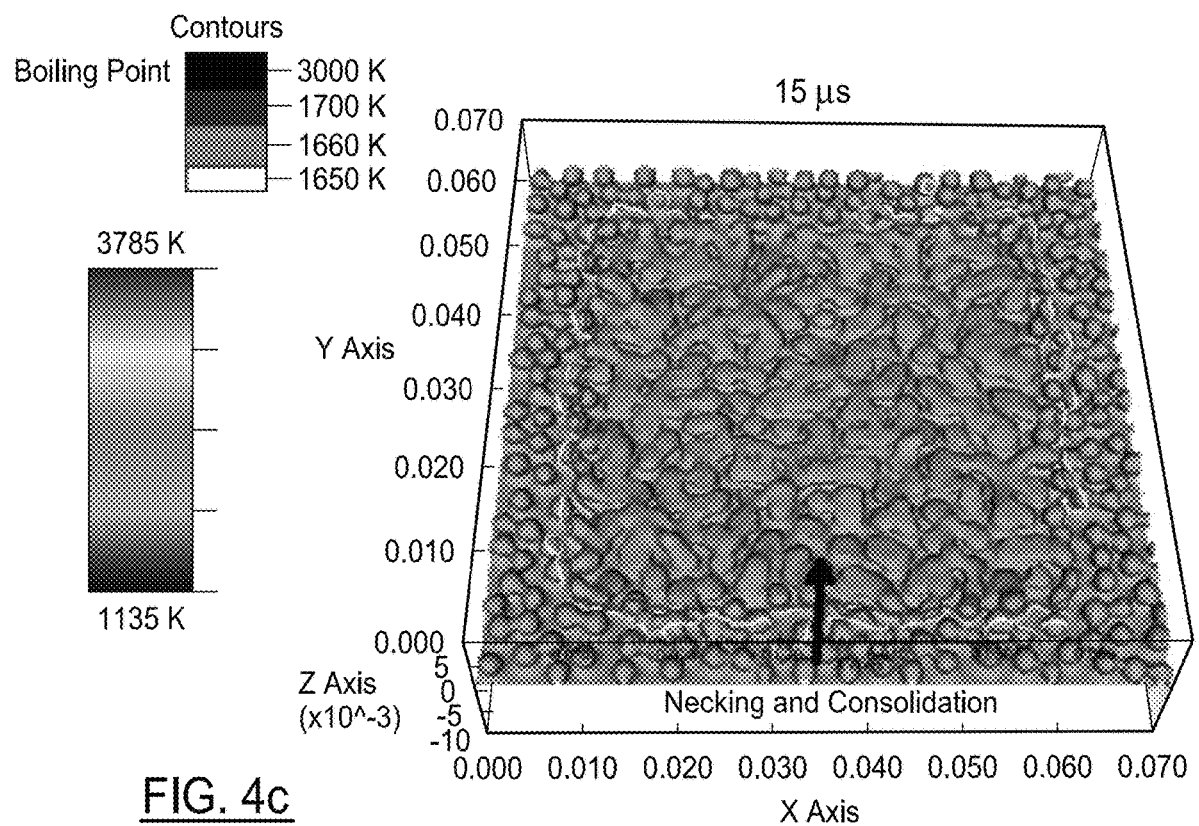
Figure 4D:
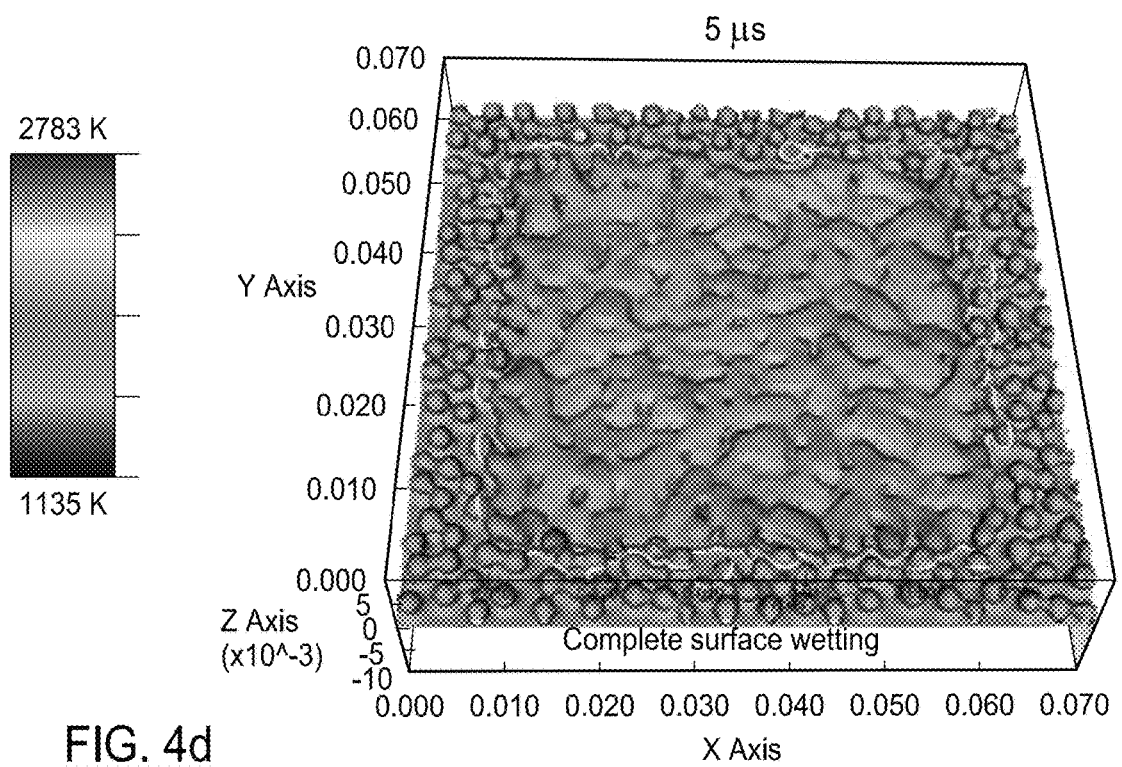
Figure 4E:
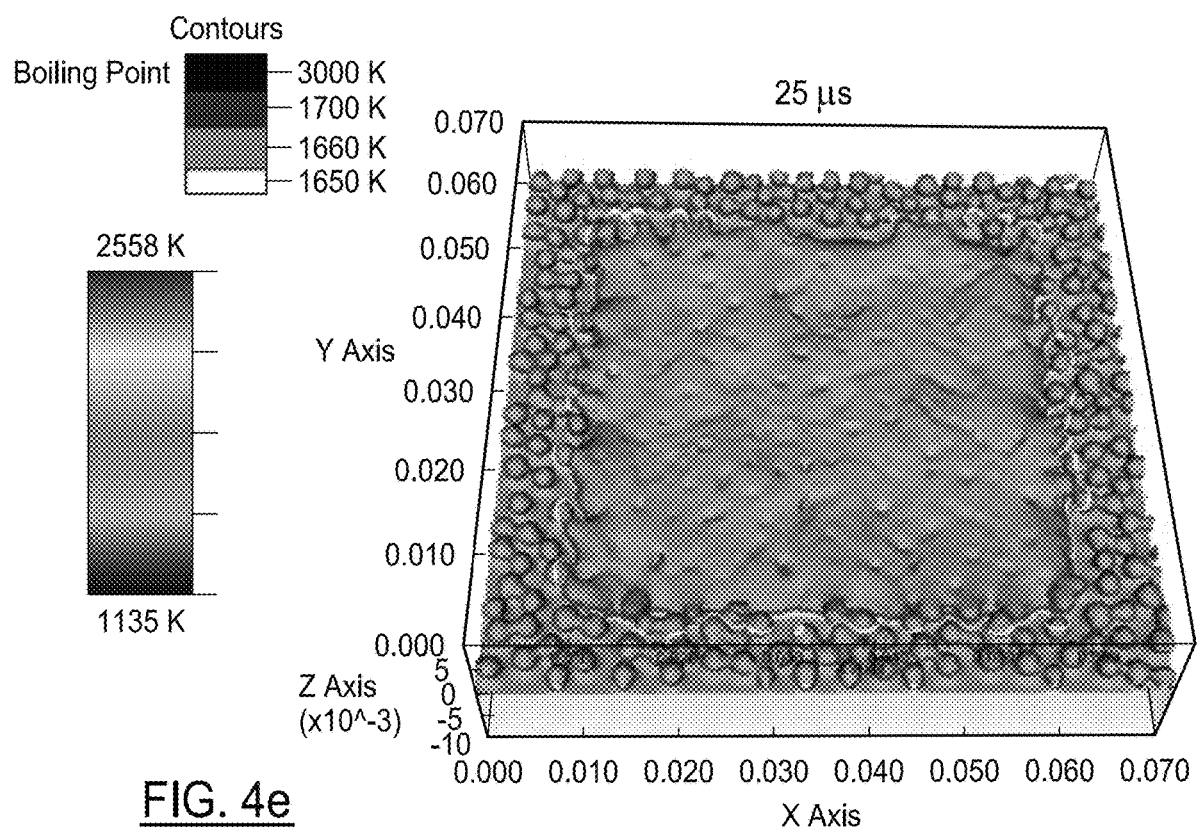
Figure 4F:
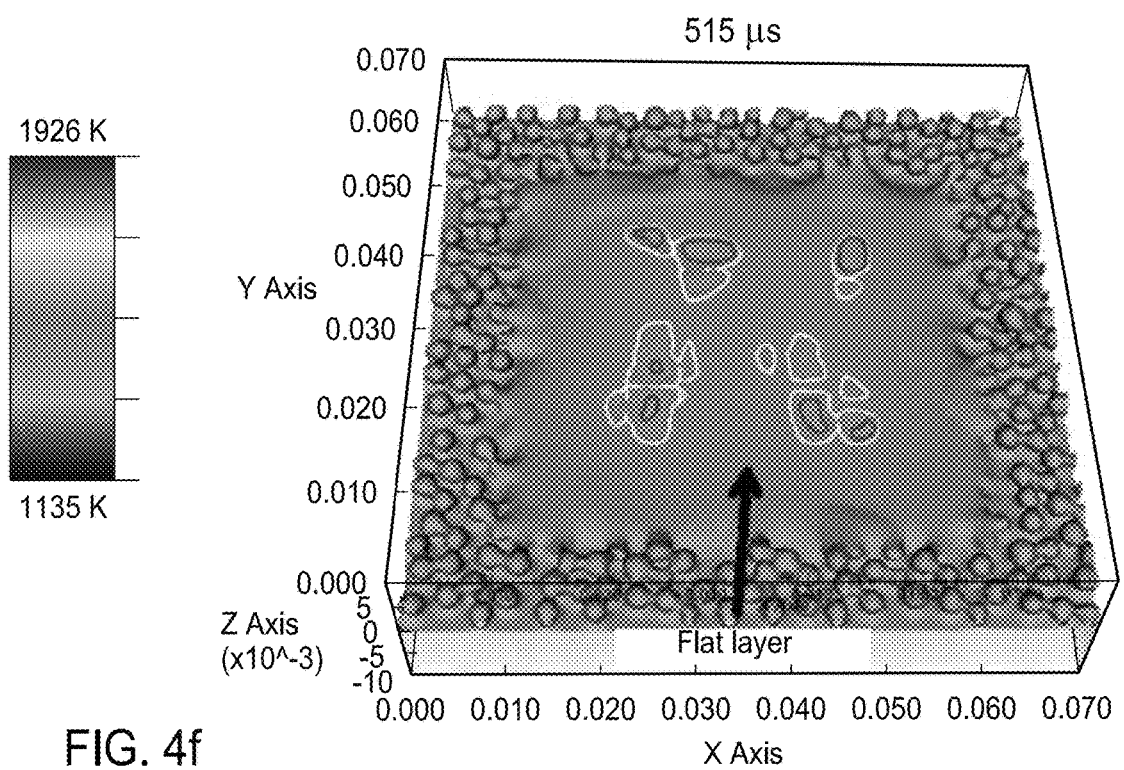

After 100 μs (FIG. 3e), the liquid motion was nearly finished and solidification began to occur at the edges, similar to that observed in the high-speed imaging. Some regions where the substrate surface did not melt during the laser pulse developed pit features because the liquid could not easily flow into these regions. These substrate areas were often shadowed by overlying powder particles, not allowing the substrate to effectively be heated. The overlying molten powder particles did not have enough stored heat to melt the cold substrate surface. In other areas, pit features that had formed (FIG. 3e) were able to be covered by liquid because sufficient thermal energy was transferred to the surface to melt, allowing the liquid to wet and flow (FIG. 3f). As solidification continued and the edges solidified, fluid flow and surface tension drew liquid into the center and generated a hill-type features in the center of the patch.

Because of the effect of shadowing was strongly affecting the ability of the diode laser subsystem 12 to heat the substrate, a simulation using the same powder size (35 μm) as in FIG. 3, but a single monolayer of powder was run using the same initial conditions and laser energy and fluence. These simulation results are shown in FIG. 4a-f. A single monolayer should have much more penetration of the laser to the substrate. The simulation using a monolayer exhibits clearly different behavior than the simulation using a thicker layer of the same powder size (35 μm), and results in a flat layer morphology.

Figure 5A:
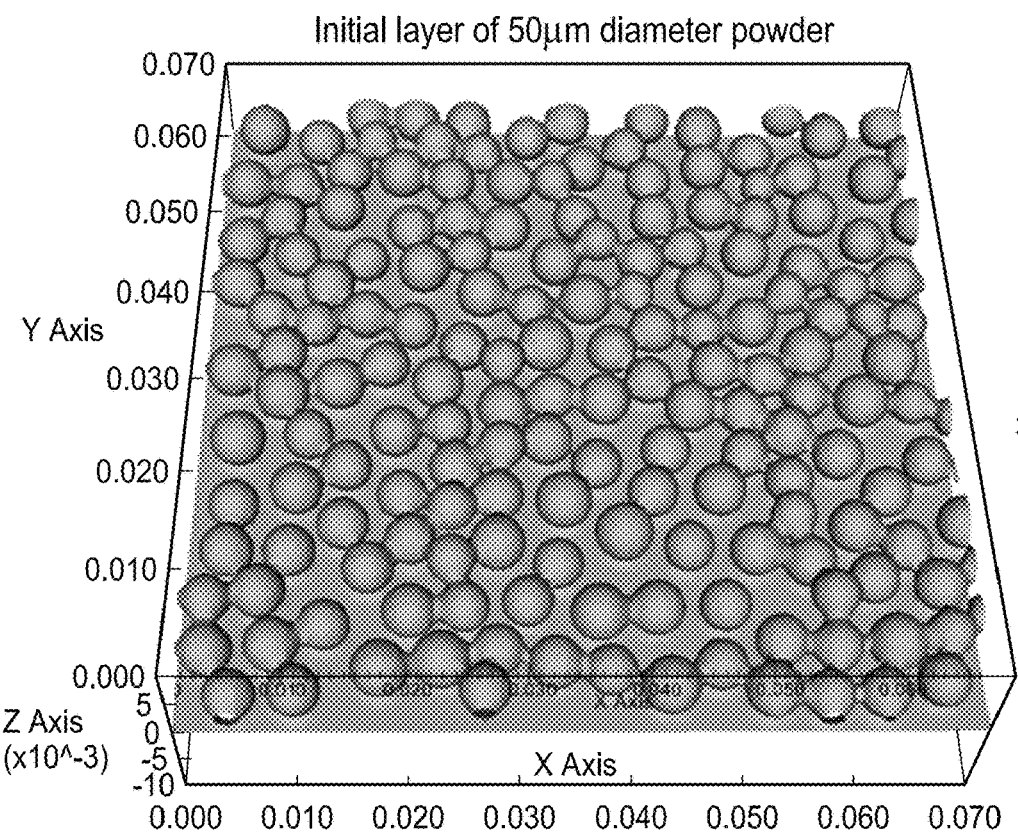
FIGS. 5a-5c show the results of a multiphysics model resulting from the use of 50 um diameter powder, and the same experimental results using 54 um diameter powder (shown at same scale)
Figure 5B:
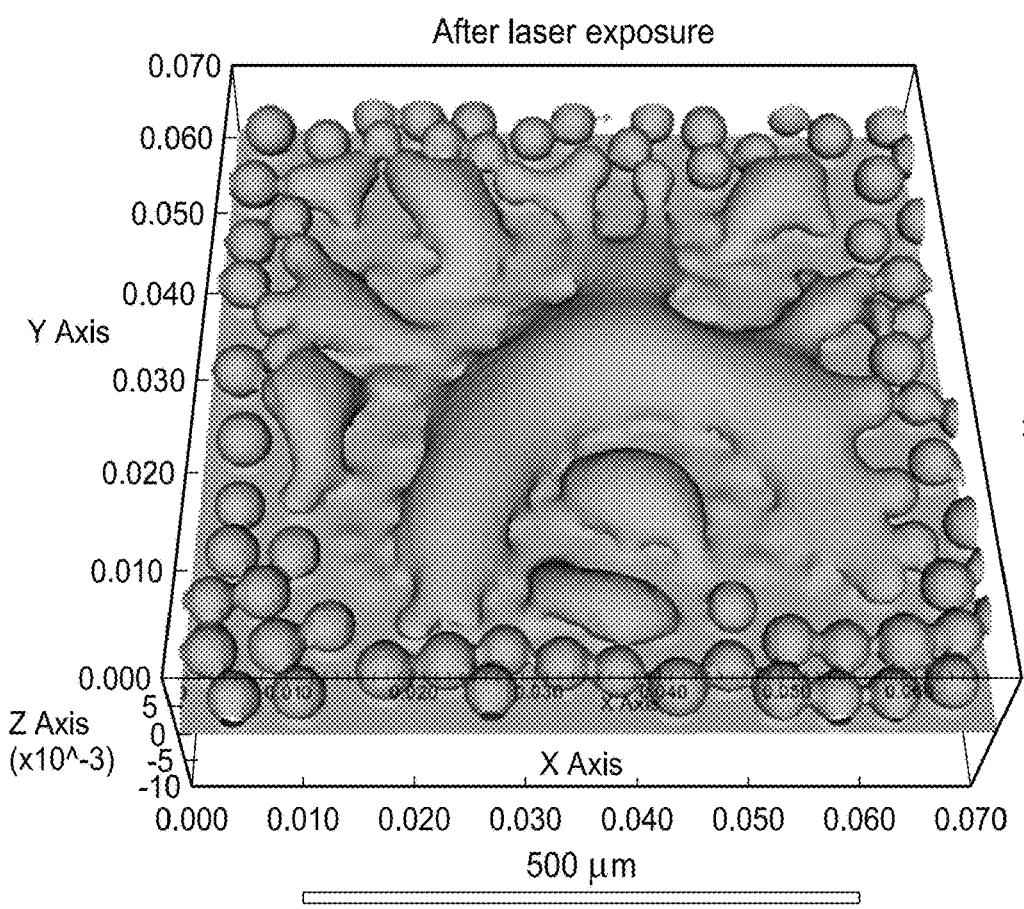
Figure 5C:
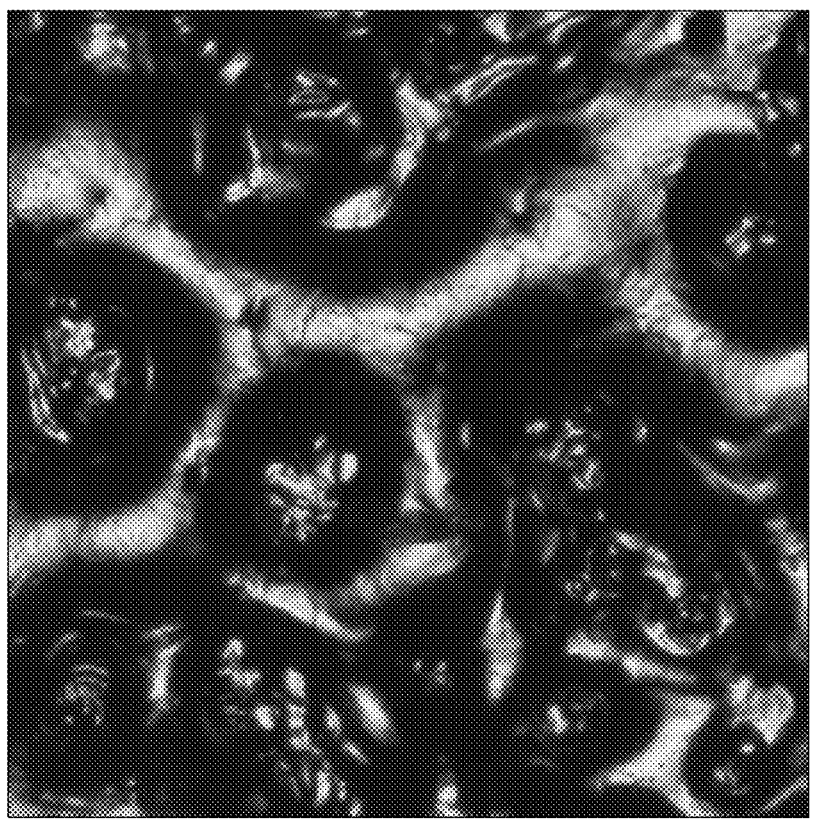
Figure 6A:
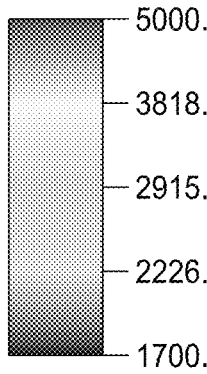
FIGS. 6a-6f are ALE3D simulations showing a thin powder layer that uses large powder particles (about 55 um)
Figure 6A:
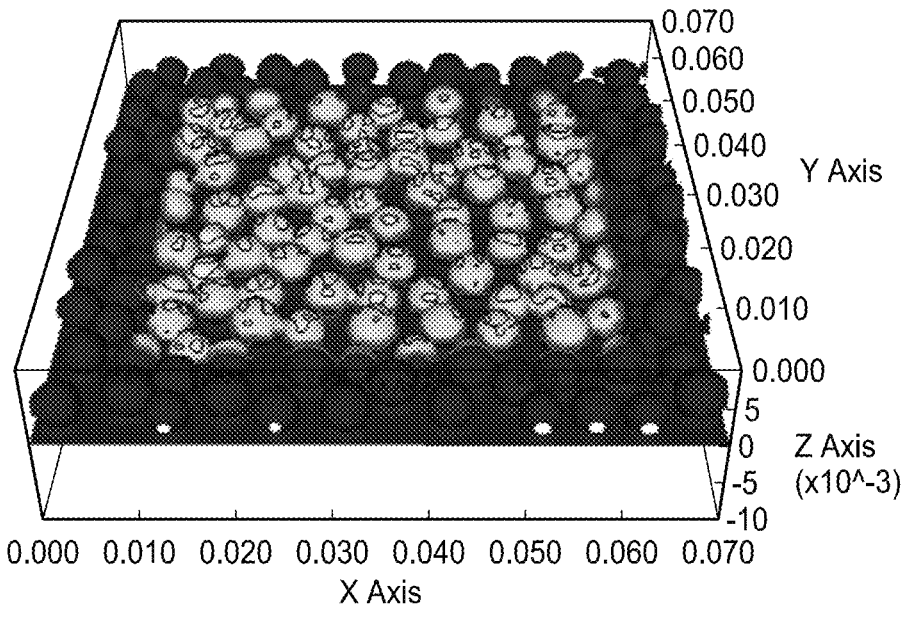
Figure 6B:
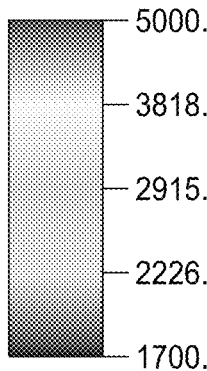
Figure 6B:
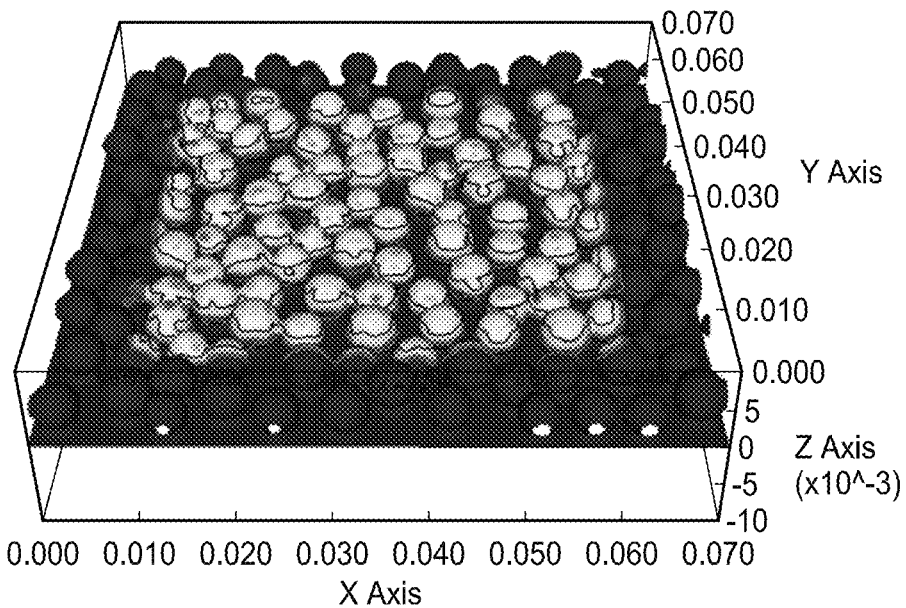
Figure 6C:
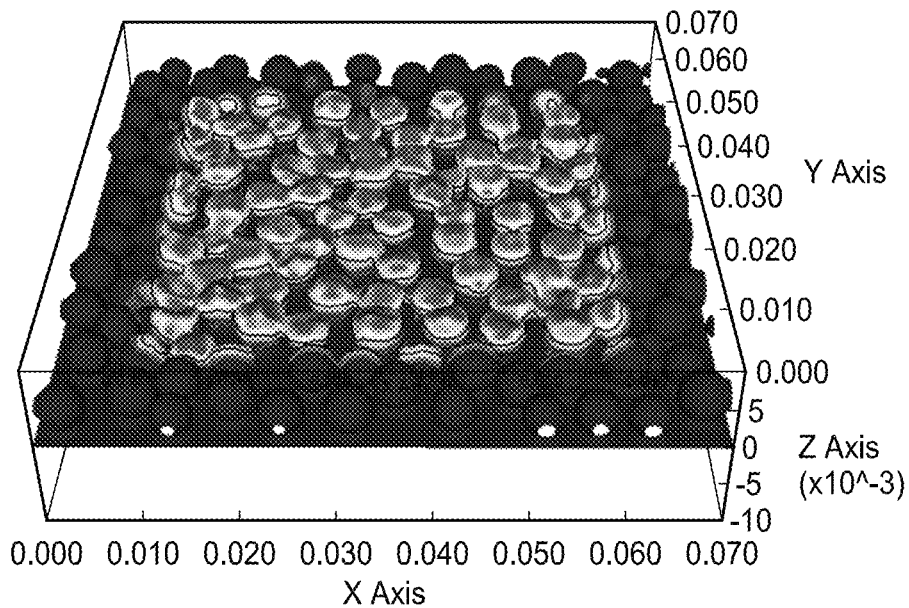
Figure 6D:
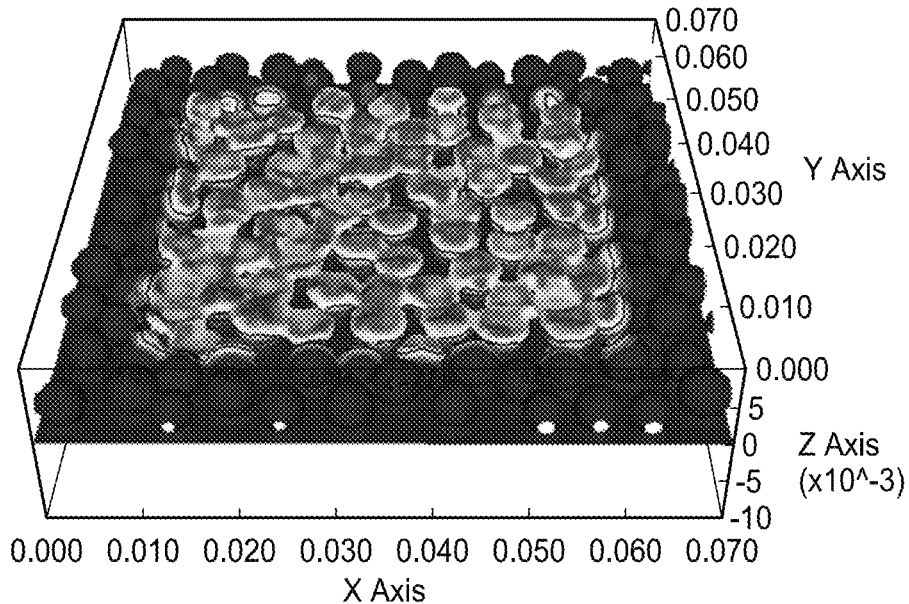
Figure 6E:
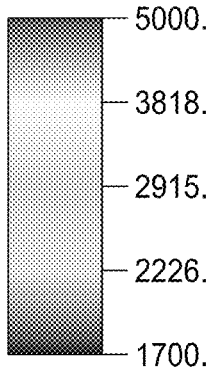
Figure 6E:
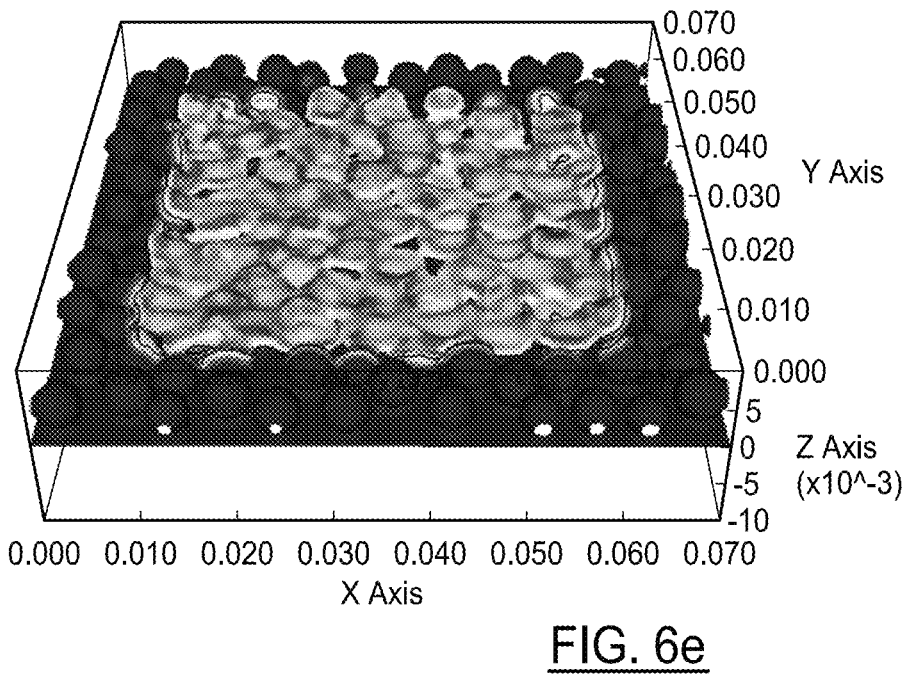
Figure 6F:
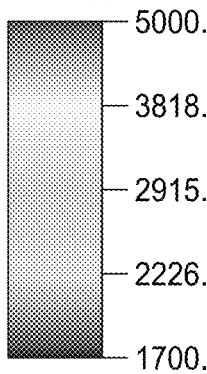
Figure 6F:
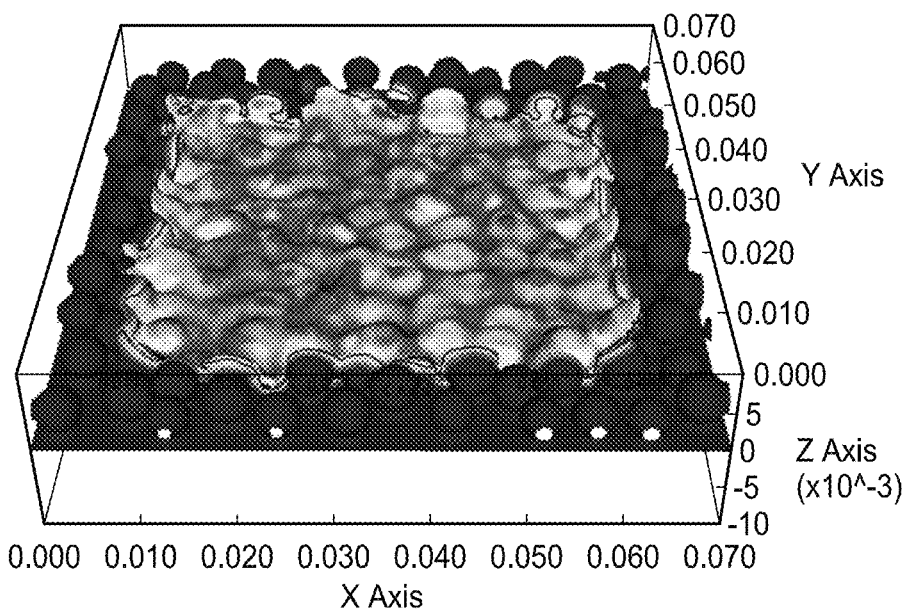
Figure 7A:
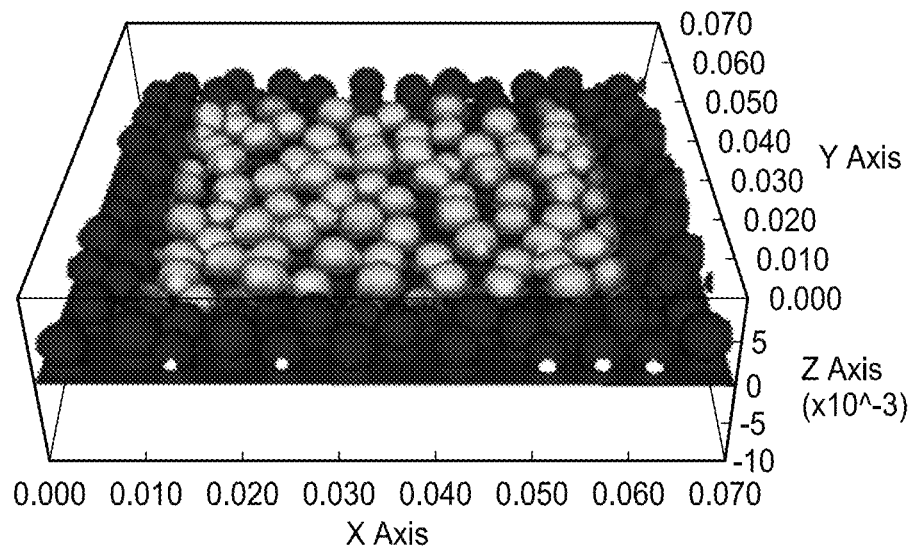
FIGS. 7a-7g are illustrations of a Multiphysics model showing different stages of melting dynamics in response to a dual pulse with larger 55 um diameter powder
Figure 7B:
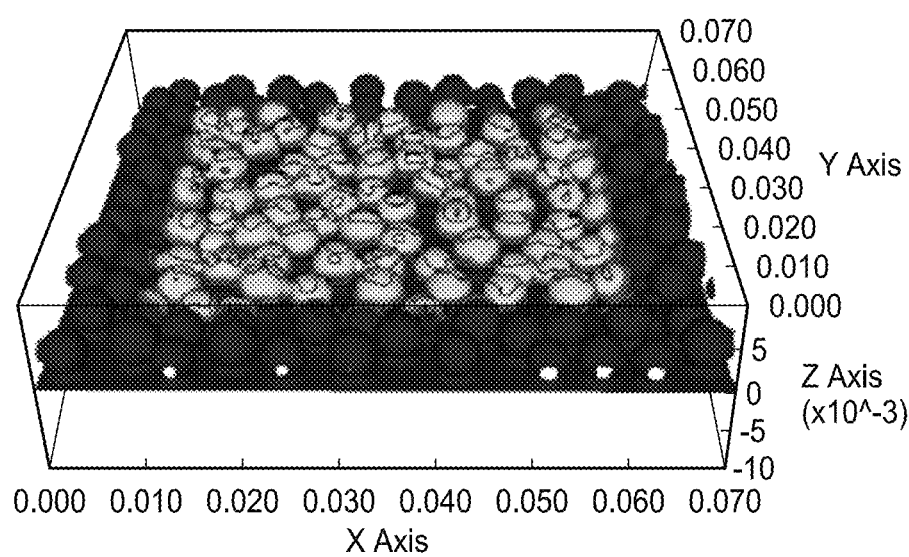
Figure 7C:
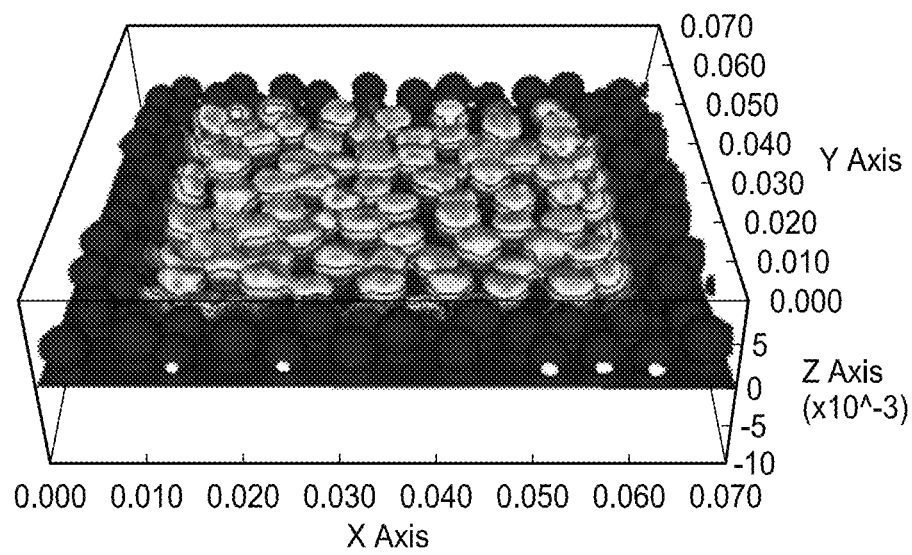
Figure 7D:
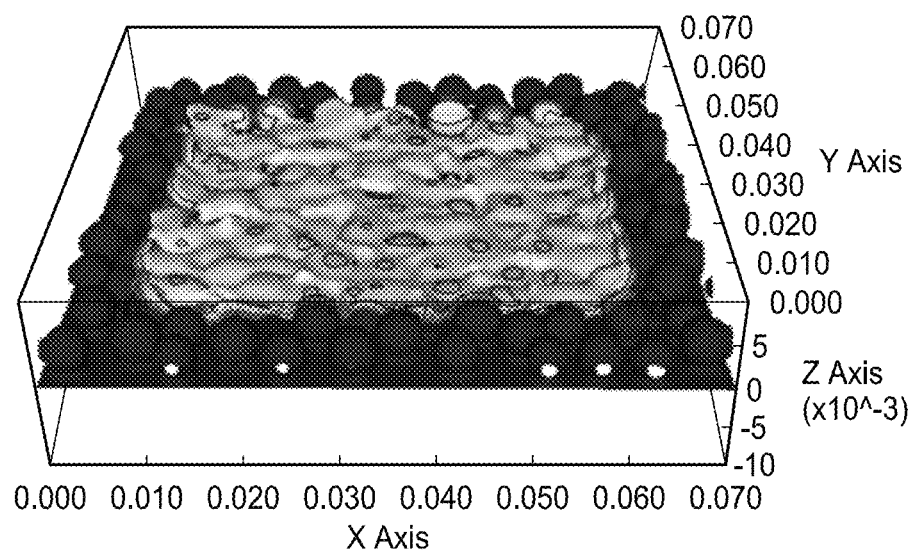
Figure 7E:
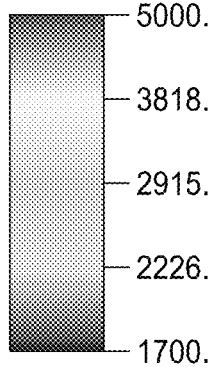
Figure 7E:
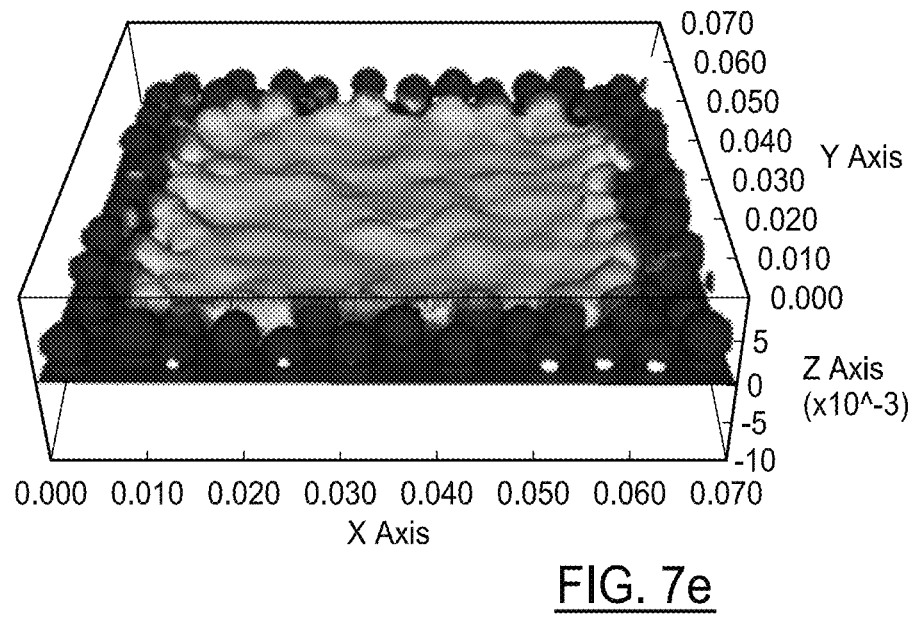
Figure 7F:
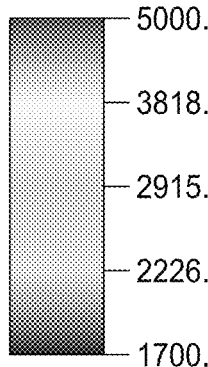
Figure 7F:
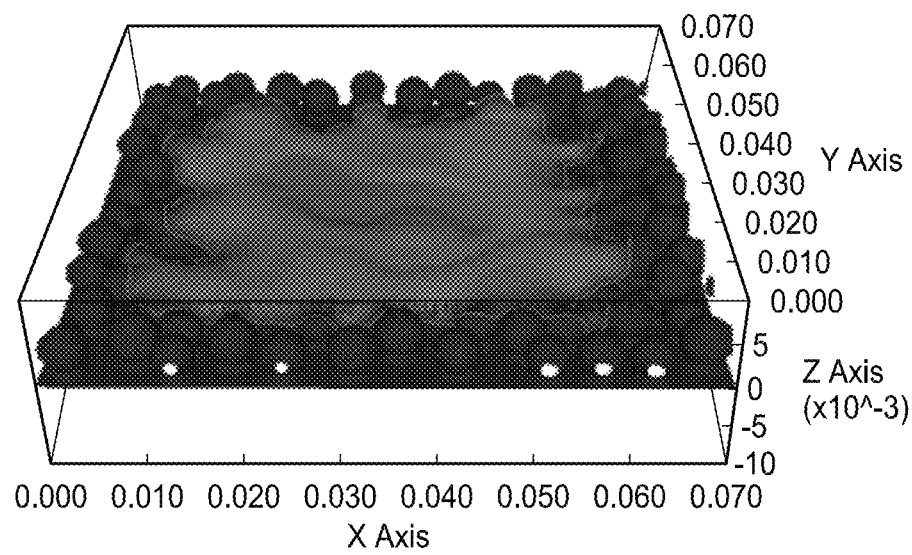
Figure 7G:
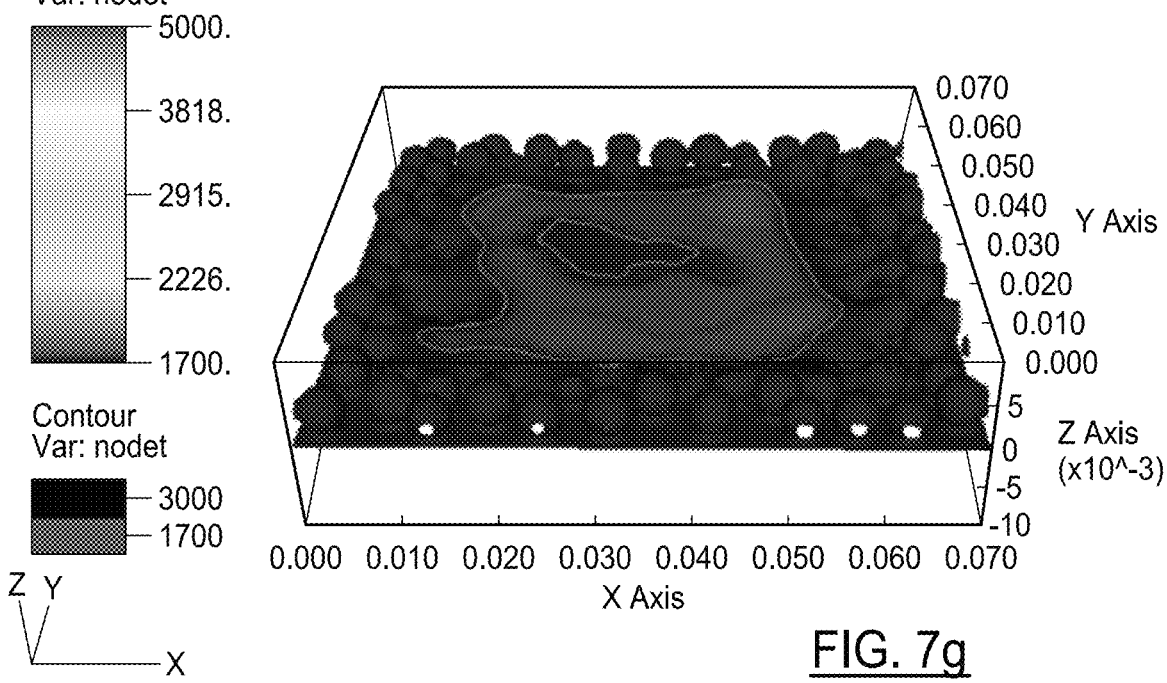

The above results raised the question as to whether a monolayer of large powder would produce the same results, with the heating of the substrate allowing a final flat morphology of the melted powder. A simulation using the same laser conditions and a monolayer of 50 μm powder is shown in FIGS. 5a and 5b. The simulation shows large pit and hill defects and closely resembles the morphology shown in FIG. 5c (average distribution centered around 54 μm powder particles), which used the same powder size and thickness. Clearly, the use of larger powder did not result in a flat layer morphology. If heat diffusion into the layer is considered, the poor morphology can be directly be attributed to insufficient time to allow for melting of the powder particles. The melting time can be estimated as $a^2/D$, where "a" is the melting depth. For a=10 μm the melting time is more than an order of magnitude longer than the pulse duration. This explains why small powder diameters could be sufficiently melted into a smooth layer, while the 50 μm diameter powder could not be, both in simulation and experiment.

Figure 8A:
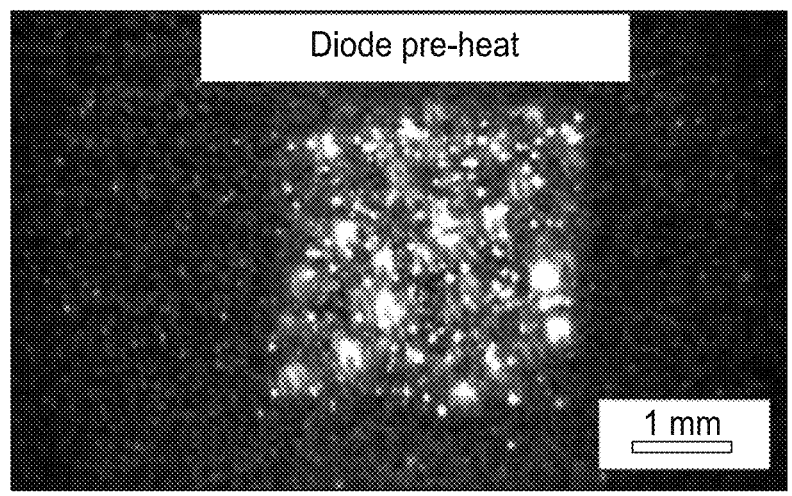
FIGS. 8a-c show high speed imaging of a 20 μm thick powder layer (a) before the pulse, after the pulse and a summation of the differences between frames, highlighting all of the liquid motion (note it is relatively uniform)
Figure 8B:
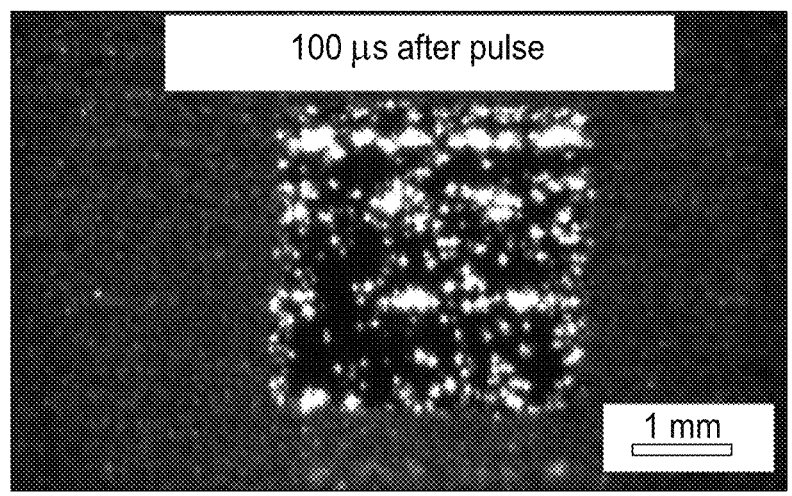
Figure 8C:
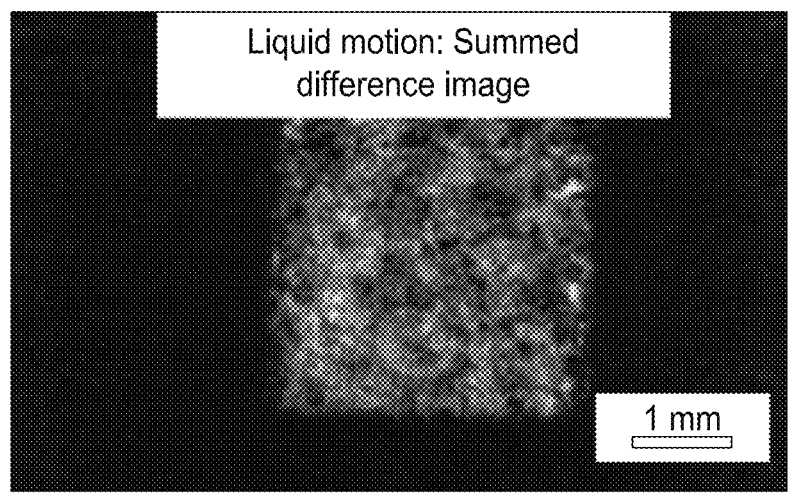

FIGS. 8a-8c show high speed imaging of a single 30 μm thick powder layer (27 μm diameter). The underlying layer is relatively flat and featureless and the powder layer smooth. The layer thickness should resemble the monolayer used in the simulation, though some smaller particles were present due to the particle size distribution. The resulting layer (FIG. 8b) shows the layer after 100 μs and having better smoothness than when using 40 μm thick layers, as predicted by the simulations. Because single layer metrology from this print was not possible (more layers were subsequently printed), an attempt to confirm reduced defects from this layer was performed in FIG. 8c by tracking liquid motion. As the liquid molten powder particles coalesce and the liquid flows into a flatter layer, the movement can be tracked by summing the differences between frames. Bright intensity indicates pronounced liquid motion, where dark intensity indicates no movement of the surface. It can be seen it is relatively smooth across the entire patch, indicating fluid motion was well distributed and that few defects were likely to have formed.

Figure 8D:
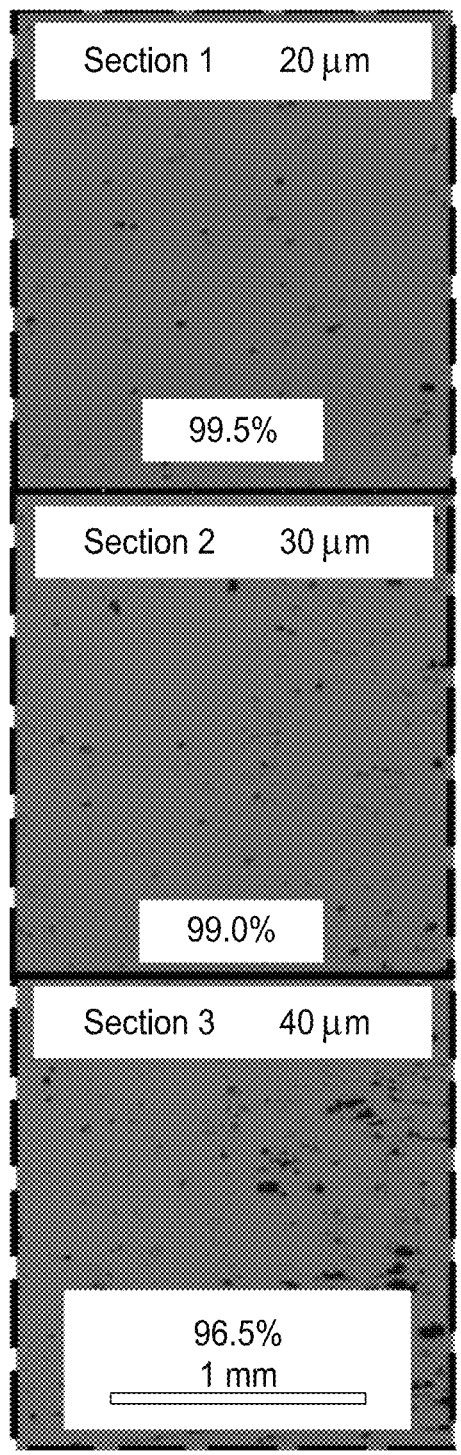
FIG. 8d shows a cross section image of a pillar built with different layer thicknesses. The density increases as the layer thickness decreases.
Figure 8E:
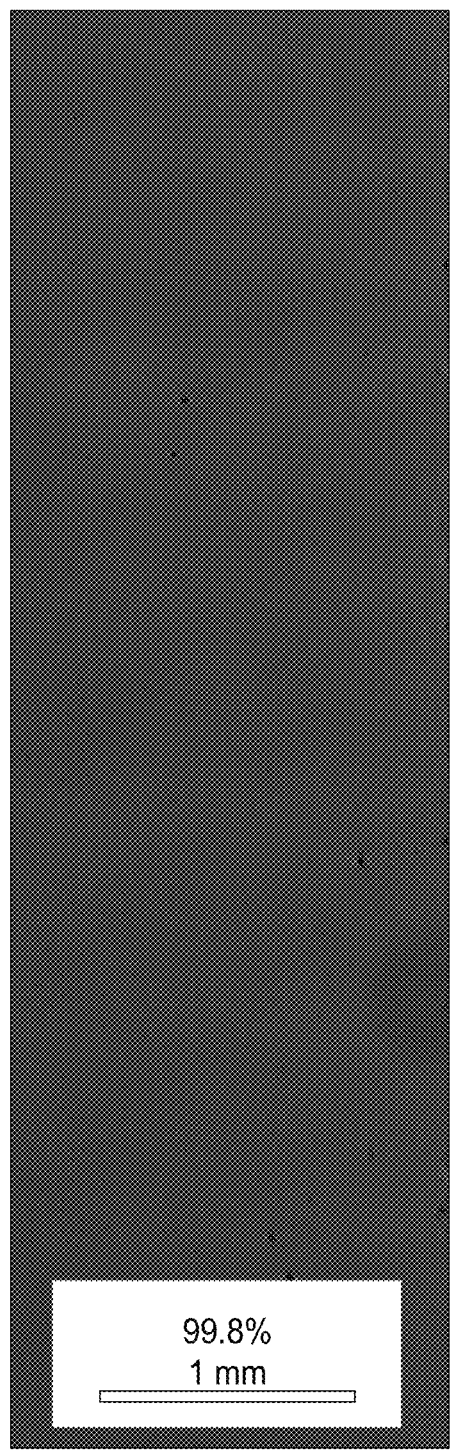
FIG. 8e shows a cross section of fully optimized prints achieving nearly full density, 99.8%.

In FIG. 8d, a pillar is shown that was built using different layer thicknesses throughout its height, while keeping the laser parameters constant. A 40 μm layer thickness (Section 3) resulted in a large amount of porosity, achieving 96.5% of theoretical density. Decreasing the layer thickness to 30 μm (Section 2) increased density to 99.0%. The best density was achieved using 20 μm layers (Section 1), achieving 99.5% of theoretical density via optical cross-section measurement. While the parts were too small for reliable measurement by Archimedes method, at high density, the results from optical microscopy are typically very close to Archimedes method. Further optimization of the melt process, (4800 W/cm², 8 ms, 0.8 J), has subsequently enabled a density of over 99.8% to be achieved consistently. FIG. 8e shows a large-scale sample with density consistently >99.8% throughout the entire build of vertically stacked tiles.

To achieve a flat, final layer morphology, it is strongly preferable to have the substrate at a temperature close to melting, so that the laser pulse and the heat transfer from the overlying particles can melt the surface effectively. The laser pulse from the pulsed laser 24 must generate a sufficiently high temperature in the melt that the molten metal can transfer sufficient heat to melt the entirety of the powder as well as the substrate surface, before conduction into the substrate pulls too much heat away from the melted particles not allowing sufficient time for them to flow into a flat layer. The amount of energy stored in the liquid is a function of laser absorptivity and the thermal mass of liquid metal. The total laser absorptivity, metal mass and local heating are largely controlled by the powder particle size and spatial distribution. The heating of the substrate by the laser pulse from the pulsed laser 24 and the diode laser subsystem 12 is somewhat challenging because absorption in the powder is much higher than the substrate due to multiple reflections. More specifically, it is known that the substrate can receive 2-5× less energy than the powder. Since there is very little thermal conductivity in the powder particles (due largely to decreased physical contact), they heat rapidly when irradiated by the pulsed laser 24 (e.g., in one implementation a Nd:YAG laser). This places additional requirements on bed temperature and diode preheating to minimize these effects.

Based on the results discussed here, process improvement could potentially be achieved by optimizing powder distribution, the pulse time envelope of the pulse generated by the pulsed laser 24, powder bed temperature, and diode laser subsystem 12 pulse time.

It will also be appreciated that recoating or spreading of powder is a challenging task to perform reproducibly and uniformly. Non-uniformities in powder thickness directly affect its melt behavior as indicated by the simulations provided in the Figures described herein. Using a powder diameter which is less than or equal to the spread thickness necessarily will improve the reproducibility and uniformity of the layer, thereby more consistently enabling full melting of the powder in a single layer. In addition, uniformly spread layers minimize shadowing of the substrate, enabling sufficient laser shine-through to heat the substrate. In contrast, traditional LPBF melts deeply into the substrate (keyhole regime), making the process less sensitive to thickness of the powder, but this comes at the cost of speed and spatter effects.

As stated above, adjusting the diode laser subsystem 12, the pulsed laser 24 or both could be used to change the temporal dynamics of this process to adapt to different print requirements. If one were to increase the laser pulse time duration of the pulsed laser 24, one can increase the effective melt depth in the powder material layer. It should be noted that the competition between conduction and melting becomes stronger at longer pulse lengths and would require increasing energy input to offset conduction losses and achieve the same degree of melting. However, these can be overcome with enough laser energy, either increasing the pulse length and intensity, or by using multiple pulses. Through either method, the melt morphology can be improved, even when using larger powders as shown in the simulations of FIGS. 6a-6f), or the simulations in FIG. 7a-7f).

Because the melt depth is quite shallow in the current process, the amount of motion the liquid can undergo from forces due to vapor ejection is reduced. The deep melting of traditional LPBF processes can cause large liquid waves, creating spatter particles that can eject, later causing defects in subsequent laser passes which can ultimately limit mechanical performance. In the current pulsed laser process using the system 10, the lack of a continuous vapor jet disallows continuous entrainment of powder particles. As seen in the high speed video in FIG. 2, there is no noticeable ejection of liquid spatter and little powder motion. Lack of liquid spatter appears to be a major advantage of this process when implemented using the system 10. While parameters to achieve high density can be optimized in typical LPBF, random spatter particles can still cause defects. In the present pulsed laser melting process, once the build parameters are optimized, there is little possibility of random spatter events causing defects.

Our simulations accounted for temperature-dependent material properties and spatially-dependent laser absorption and gave a detailed understanding of the pulsed melting process. It was found that physical effects similar to traditional LPBF laser played a role, with some important differences. The melting of powders, fluid flow, vapor pressure, and energy coupling into the substrate all played an important role in the consolidation process.

It was found that after the laser pulse arrived very little material ejection was seen, unlike in continuous laser melting where powder and liquid ejection are common. Points at the top of powder particles reached the boiling point and vapor pressure recoil flattened the molten drops causing necks to form between adjacent droplets. When short pulses of the laser were used, the powder under the laser pulse melted only to a certain depth, where large diameter powder particles would not melt completely. Longer pulses or multiple pulses could overcome this, with the caveat of needing higher deposited energy. During short pulses, depending on the powder size and distribution, some areas of the substrate could melt or be shadowed by the overlying powder and not melt. The non-wetted areas tended to form pit-like features that were difficult to fill in with subsequent layers. To achieve high-quality, high density builds, a flat layer morphology is desired. Simulations predicted that small powder diameter and thin layer thicknesses would result in featureless layers by allowing the substrate to be more effectively heated by the incoming pulse and allow the molten powder to melt the surface and flow outward into a flat morphology. Experiments replicating these conditions resulted in builds with >99.8% of theoretical density.

The prospect of using large-area pulsed laser melting for LPBF parts seems promising to reduce manufacturing time for AM, and this approach is generalizable to any material that melts and freezes, not just the 316L considered here. In this study, only a few of the many variables were evaluated. However, by controlling just the powder size and layer thickness, the process described herein can effectively enable the large-area laser pulse to achieve high density parts to be built at faster rates. In addition, the presently described pulsed LPBF process has the ability to change pulse length and duration on a per-voxel basis during the print. This spatial-temporal control has the potential to enable further control over the melt pool, cooling/heating rates, microstructure composition, grain orientation, and mitigation of residual stress.

Figure 9:
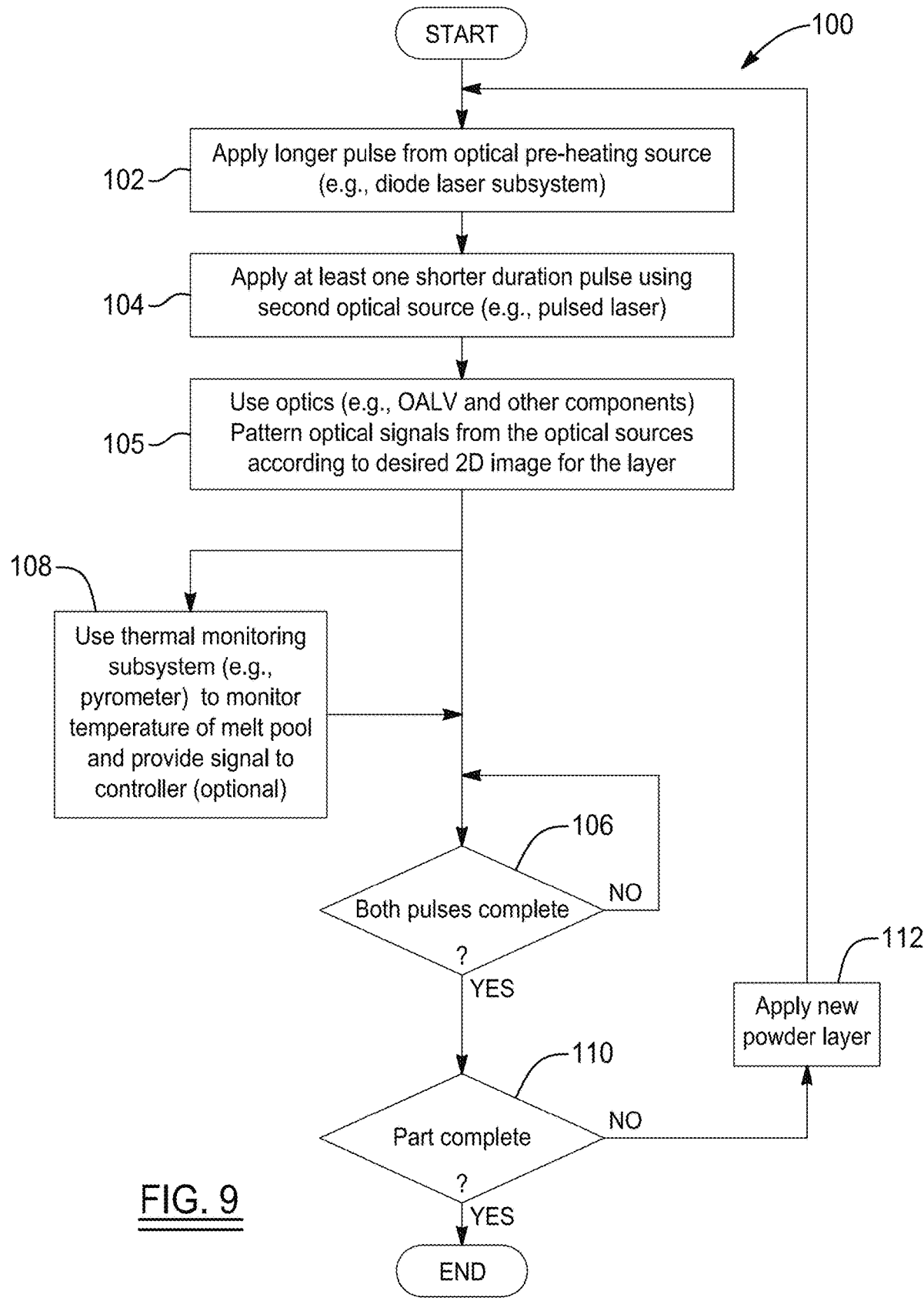
FIG. 9 is a high level flowchart illustrating one example of various operations that may be performed using a method of the present disclosure.

Referring briefly to FIG. 9, a high level flowchart 100 is shown illustrating high level operations using the system 10 to carry out one example of a method in accordance with the present disclosure. At operation 102 the longer duration pulse may be generated using the first optical source (e.g., diode laser subsystem 12) to begin pre-heating the powder particles. Shortly thereafter, at operation 104, one or more shorter duration second pulses may be generated to fully melt the powder particles and the substrate. At operation 105, the optics of the system (e.g., OALV 30 and/or other components) may then be used to pattern the optical signal according to a desired 2D image for the layer before the optical signals are applied to the substrate. Optionally, as shown at operation 108, the temperature of the melt pool created may be monitored using a suitable component (e.g., pyrometer 54) and a corresponding signal provided to the controller 52. At operation 106 a check is made if both pulses are complete. If pulses are not finished, the check at operation 106 is repeated until the check indicates that both pulses are complete, at which point a check is made at operation 110 to determine if the part is complete. If this check produces a "No" answer, then a new powder layer may be formed on the just-formed layer (which now becomes the new substrate), as indicated at operation 112, and operations 102-110 are repeated. When the check at operation 110 indicates the part is complete, the method ends.

CONCLUSION

It will be appreciated that the present disclosure explains new strategies for achieving full density which were not possible with previous LBPF approaches that used very short pulses or large powder sizes. The teachings presented herein show that in one aspect, powder size and layer thickness control is strongly preferred for high density printing. Alternatively, laser control may be used to keep the optical intensity sufficiently low to avoid excessive boiling of the material, but still long enough to fully melt the powder and substrate.

The present disclosure has also presented considerable teaching on the physics of pulsed laser melting of metallic powder, as investigated by the co-inventors using high-speed imaging and multi-physics simulations. The simulations accounted for temperature-dependent material properties and spatially-dependent laser absorption and provide a highly detailed understanding of the pulsed melting process. It was found that physical effects similar to traditional LPBF laser played a role, with some important differences. The melting of powders, fluid flow, vapor pressure, and energy coupling into the substrate all play an important role in the consolidation process.

The system 10 and the method described herein provides that, after the laser pulse arrives from the pulse laser 24, very little material ejection is seen, unlike in continuous laser melting where powder and liquid ejection are common. Points at the top of powder particles reached the boiling point and vapor pressure recoil flattened the molten drops causing necks to form between adjacent droplets. Depending on the powder size and distribution, some areas of the substrate could melt or be shadowed by the overlying powder and not melt. The ability of the liquid powder to wet the substrate surface depends on the substrate already being molten or the liquid having sufficient stored energy and rapid heat transfer to melt the substrate.

The prospect of using large-area pulsed laser melting for LPBF parts is highly promising to reduce manufacturing time for AM, and the system 10 and methods described herein are generalizable to virtually any material that melts and freezes, not just the 316L considered in the foregoing discussion. While the present disclosure is not an exhaustive study, with only a few of the many variables affecting powder melting being evaluated, it has been discovered that by controlling just the powder size and layer thickness, the process can effectively allow the large-area laser pulse to achieve high density parts to be built at faster rates by using short laser pulses. In addition, the system 10 and methods described herein, which form a pulsed LPBF process, have the ability to change pulse length and duration on a per-voxel basis during the print to achieve high density builds from a variety of powder particle sizes and distributions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for performing large area laser powder bed fusion (LBPF) to form a plurality of layers of a 3D part in a layer-by-layer fashion using meltable powder particles, the system comprising:
   a first light source for generating a first light pulse of a first duration, the first light pulse operating to preheat a substrate underneath a new layer of powder particles, wherein the substrate is formed from a previously fused quantity of the powder particles;
   a second light source for generating a second light pulse subsequent to the generation of the first light pulse, wherein the second light pulse has a duration shorter than the first duration by a factor of at least 10, and fully melts the new layer of powder particles in addition to the substrate, to achieve a smooth printed layer; and
   wherein a wavelength of the first light pulse differs from a wavelength of the second light pulse.

2. The system of claim 1, wherein the wavelength of the first light pulse differs by at least 10 nm from the wavelength of the second light pulse.

3. The system of claim 1, wherein an intensity of the first light pulse differs from an intensity of the second light pulse by a factor of at least 10.

4. The system of claim 1, wherein an intensity of the first light pulse is from 1 kW/cm$^2$-20 kW/cm$^2$; and
   an intensity of the second light pulse is from 0.2 MW/cm$^2$-2,000 MW/cm$^2$.

5. The system of claim 1, wherein the duration of the first light pulse is between 100 us-100 ms.

6. The system of claim 1, wherein the duration of the second light pulse is between 10 ns-10 us.

7. The system of claim 1, wherein the intensity of the first light pulse is from 1 kW/cm$^2$-20 kW/cm$^2$; and
   the intensity of the second light pulse is from 0.2 MW/cm$^2$-2,000 MW/cm$^2$.

8. The system of claim 1, wherein the new layer of powder particles comprises a thickness of no more than 1.5 times an average diameter or thickness of a distribution of the powder particles.

9. A system for performing large area laser powder bed fusion (LBPF) to form a plurality of layers of a 3D part in a layer-by-layer fashion using meltable powder particles, the system comprising:
   a first light source for generating a first light pulse of a first duration, the first duration being between 10 us and 100 ms, and the first light pulse operating to preheat a substrate underneath a new layer of powder particles, wherein the substrate is formed from a previously fused quantity of the powder particles;
   a second light source for generating a second light pulse subsequent to the first light pulse, wherein the second light pulse has a second duration between 10 ns and 10 us;
   the first light pulse having a first power level and the second light pulse having a second power level, wherein an intensity of the second pulse is on the order of at least 10 times an intensity of the first light pulse; and
   wherein the second light pulse serves to fully melt the new layer of powder particles in addition to the substrate, to achieve a smooth printed layer.

10. The system of claim 9, wherein a wavelength of the first light pulse differs from a wavelength of the second light pulse.

11. The system of claim 9, wherein a wavelength of the first light pulse differs from a wavelength of the second light pulse by at least 10 nm.

12. A method for performing large area laser powder bed fusion (LBPF) to form a plurality of layers of a 3D part in a layer-by-layer fashion using meltable powder particles, the method comprising:
   configuring the meltable powder particles in a new material layer no more than about 50 um in thickness on a substrate, wherein the substrate is a previously fused material layer formed from the meltable powder particles;
   generating a first light pulse of a first duration, the first light pulse operating to preheat the substrate underneath the new material layer of powder particles; and
   generating a second light pulse of a second duration shorter than the first duration by a factor of at least 10, which operates to fully melt the new material layer of powder particles in addition to fully melting the substrate, to achieve a smooth printed layer.

13. The method of claim 12, wherein generating a first light pulse comprises generating a first light having a first wavelength; and
   wherein generating a second light pulse comprises generating a second light pulse having a second wavelength which is greater than the first wavelength.

14. The method of claim 12, wherein the first and second wavelengths differ by at least 10 nm.

15. The method of claim 12, wherein an intensity of the first light pulse is from 1 kW/cm$^2$-20 kW/cm$^2$; and an intensity of the second light pulse is from 0.2 MW/cm$^2$-2,000 MW/cm$^2$.

16. The method of claim 12, wherein the first duration is between 100 us and 100 ms.

17. The method of claim 12, wherein the second duration is between 10 ns and 10 us.

* * * * *